(12) United States Patent
Chen et al.

(10) Patent No.: US 11,841,585 B2
(45) Date of Patent: Dec. 12, 2023

(54) DISPLAY APPARATUS AND METHOD OF DRIVING THE SAME

(71) Applicant: Coretronic Corporation, Hsin-Chu (TW)

(72) Inventors: Ping-Yen Chen, Hsin-Chu (TW); Chung-Yang Fang, Hsin-Chu (TW); Chun-Wei Lee, Hsin-Chu (TW); Jung-Wei Chang, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 18/167,149

(22) Filed: Feb. 10, 2023

(65) Prior Publication Data
US 2023/0205008 A1    Jun. 29, 2023

Related U.S. Application Data

(63) Continuation-in-part of application No. 17/980,560, filed on Nov. 4, 2022.
(Continued)

(30) Foreign Application Priority Data

Feb. 10, 2022  (CN) .......................... 202220271373.2
Feb. 6, 2023   (CN) .......................... 202320173386.0

(51) Int. Cl.
*G02F 1/13357*    (2006.01)
*G02F 1/1335*     (2006.01)
(Continued)

(52) U.S. Cl.
CPC ...... *G02F 1/133611* (2013.01); *G02B 6/0053* (2013.01); *G02F 1/1337* (2013.01);
(Continued)

(58) Field of Classification Search
CPC .............. G02F 1/1323; G02F 1/133531; G02F 1/133757; G02F 1/1347; G02F 1/133607;
(Continued)

(56) References Cited

U.S. PATENT DOCUMENTS 7,880,843 B2 *  2/2011  Morishita ........... G02F 1/13363
                                                   349/119
8,982,300 B2 *  3/2015  Umemoto ......... G02F 1/133528
                                                    349/96
(Continued)

FOREIGN PATENT DOCUMENTS

CN        111796438        10/2020
TW        I698668           7/2020

*Primary Examiner* — Chun-Nan Lin
(74) *Attorney, Agent, or Firm* — JCIPRNET

(57) ABSTRACT

A display apparatus including a backlight module, first and second electrically-controlled elements, electrically-controlled first and second polarizers, a half-wave plate, and a display panel is provided. An included angle between first and second alignment directions of first and second alignment layers of the first electrically-controlled element is between 75 degrees and 105 degrees. An included angle between third and fourth alignment directions of third and fourth alignment layers of the second electrically-controlled element is between 165 degrees and 195 degrees. The half-wave plate is disposed between the second polarizer and the second electrically-controlled element. The display panel is disposed on the second electrically-controlled element. An included angle between an extending direction of prism structures of each of two optical brightness enhancement films of the backlight module and a viewing angle control direction of the display apparatus is less than 45 degrees. A method of driving the display apparatus is provided.

16 Claims, 30 Drawing Sheets

Related U.S. Application Data

(60) Provisional application No. 63/285,475, filed on Dec. 2, 2021.

(51) Int. Cl.
*F21V 8/00* (2006.01)
*G02F 1/13363* (2006.01)
*G02F 1/1337* (2006.01)

(52) U.S. Cl.
CPC .... *G02F 1/13363* (2013.01); *G02F 1/133531* (2021.01); *G02F 1/133607* (2021.01)

(58) Field of Classification Search
CPC ........... G02F 1/133611; G02F 1/13363; G02F 1/133638; G02F 1/1337; G02F 1/137; G02F 2413/01; G02F 2413/03; G02F 2413/05; G02F 2413/06; G02F 2413/08; G02F 2413/12; G02B 6/0053; G02B 6/0056; G09G 2320/068; G09G 2358/00; G09G 3/36
See application file for complete search history.

(56) References Cited

U.S. PATENT DOCUMENTS

| | | | |
|---|---|---|---|
| 9,104,070 B2* | 8/2015 | Kang | G02F 1/134309 |
| 10,216,018 B2* | 2/2019 | Fang | G02F 1/13363 |
| 10,921,622 B2* | 2/2021 | Chen | G02F 1/1337 |
| 2004/0239580 A1* | 12/2004 | Nagatani | G02F 1/133621 |
| | | | 345/1.3 |
| 2009/0174843 A1* | 7/2009 | Sakai | G02F 1/13471 |
| | | | 349/74 |
| 2013/0038821 A1* | 2/2013 | Wu | G02F 1/133504 |
| | | | 349/96 |
| 2015/0261039 A1* | 9/2015 | Kang | G02F 1/134309 |
| | | | 349/102 |
| 2015/0346532 A1* | 12/2015 | Do | G02F 1/133528 |
| | | | 349/96 |
| 2018/0210243 A1* | 7/2018 | Fang | G02F 1/137 |
| 2018/0215843 A1* | 8/2018 | Hoshino | C08L 101/12 |
| 2019/0196236 A1* | 6/2019 | Chen | G02F 1/1323 |
| 2022/0269115 A1* | 8/2022 | Chen | G02F 1/132 |

* cited by examiner

DISPLAY APPARATUS AND METHOD OF DRIVING THE SAME

CROSS-REFERENCE TO RELATED APPLICATION

This application is a continuation-in-part application of and claims the priority benefit of U.S. application Ser. No. 17/980,560, filed on Nov. 4, 2022, which claims the priority benefit of U.S. provisional application Ser. No. 63/285,475, filed on Dec. 2, 2021, and the priority of China application serial no. 202220271373.2, filed on Feb. 10, 2022. The entirety of the above-mentioned patent application is hereby incorporated by reference herein and made a part of this specification.

BACKGROUND

Technical Field

The invention relates to a display apparatus and a method of driving the display apparatus, and particularly relates to a display apparatus having a viewing angle control function and a method of driving the display apparatus.

Description of Related Art

In order to allow multiple viewers to watch a display image at the same time, a display apparatus usually has a wide viewing angle display effect. However, in some situations or occasions, such as browsing private web pages, confidential information, or entering passwords in public, the wide viewing angle display effect is likely to cause the image to be peeped by others, resulting in leakage of confidential information. In order to achieve an anti-peep effect, a general practice is to place a light control film (LCF) in front of a display panel to filter out large-angle light, and set an electrically-controlled diffuser on a light-emitting side of the light control film, such that the display apparatus may be switched between different display modes (such as a wide viewing angle mode and a narrow viewing angle mode).

In order to improve traffic safety, the above-mentioned display apparatus may be designed to have a single-side anti-peep effect. For example: when a vehicle is running, a single-side anti-peep function is turned on, so that the display apparatus does not display images to a driver, but may display the images to a passenger. However, the arrangement of the light control film and the electrically-controlled diffuser not only reduces an overall brightness of the display apparatus, but also increases operating power consumption.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY

The invention is directed to a display apparatus with an electrically-controlled viewing angle range, smaller color shift in a narrow viewing angle mode and better anti-peep effect and a method of driving the display apparatus.

Other objects and advantages of the invention may be further illustrated by the technical features broadly embodied and described as follows.

In order to achieve one or a portion of or all of the objects or other objects, an embodiment of the invention provides a display apparatus. The display apparatus includes a backlight module, a first electrically-controlled element, a second electrically-controlled element, a first polarizer, a second polarizer, a half-wave plate, and a display panel. The first electrically-controlled element is disposed on the backlight module and includes a first liquid-crystal layer, a first alignment layer, and a second alignment layer. The first liquid-crystal layer is sandwiched between the first alignment layer and the second alignment layer. An included angle between a first alignment direction of the first alignment layer and a second alignment direction of the second alignment layer is greater than or equal to 75 degrees and less than or equal to 105 degrees. The second electrically-controlled element is disposed on the first electrically-controlled element and includes a second liquid-crystal layer, a third alignment layer, and a fourth alignment layer. The second liquid-crystal layer is sandwiched between the third alignment layer and the fourth alignment layer. An included angle between a third alignment direction of the third alignment layer and a fourth alignment direction of the fourth alignment layer is greater than or equal to 165 degrees and less than or equal to 195 degrees. An included angle between the second alignment direction and the third alignment direction is greater than or equal to 30 degrees and less than or equal to 60 degrees, or greater than or equal to 120 degrees and less than or equal to 150 degrees. The first polarizer is provided between the backlight module and the first electrically-controlled element, and has a first absorption axis parallel or perpendicular to the first alignment direction. The second polarizer is provided between the first electrically-controlled element and the second electrically-controlled element, and has a second absorption axis. An axial direction of the second absorption axis is perpendicular to an axial direction of the first absorption axis. The half-wave plate is provided between the second polarizer and the second electrically-controlled element. The display panel is disposed on the second electrically-controlled element. The backlight module includes a light guide plate, a first optical brightness enhancement film and a second optical brightness enhancement film. The light guide plate has a light incident surface, and a light-emitting surface and a bottom surface connected to the light incident surface and opposite to each other. The first optical brightness enhancement film is disposed on a side of the light-emitting surface of the light guide plate, and has a plurality of first prism structures. An included angle between an extending direction of the first prism structures and a first viewing angle control direction of the display apparatus is less than 45 degrees. The second optical brightness enhancement film is disposed on a side of the first optical brightness enhancement film away from the light guide plate, and has a plurality of second prism structures. An included angle between an extending direction of the second prism structures and the first viewing angle control direction of the display apparatus is less than 45 degrees.

In order to achieve one or a portion of or all of the objects or other objects, an embodiment of the invention provides a display apparatus. The display apparatus includes a backlight module, a first electrically-controlled element, a second electrically-controlled element, a first polarizer, a second polarizer, a half-wave plate, a display panel and a compensation film. The first electrically-controlled element is disposed on the backlight module and includes a first liquid-crystal layer, a first alignment layer, and a second alignment layer. The first liquid-crystal layer is sandwiched between the first alignment layer and the second alignment layer. An included angle between a first alignment direction of the first alignment layer and a second alignment direction of the second alignment layer is greater than or equal to 75 degrees and less than or equal to 105 degrees. The second electrically-controlled element is disposed on the first electrically-controlled element and includes a second liquid-crystal layer, a third alignment layer, and a fourth alignment layer. The second liquid-crystal layer is sandwiched between the third alignment layer and the fourth alignment layer. An included angle between a third alignment direction of the third alignment layer and a fourth alignment direction of the fourth alignment layer is greater than or equal to 165 degrees and less than or equal to 195 degrees. An included angle between the second alignment direction and the third alignment direction is greater than or equal to 30 degrees and less than or equal to 60 degrees, or greater than or equal to 120 degrees and less than or equal to 150 degrees. The first polarizer is provided between the backlight module and the first electrically-controlled element, and has a first absorption axis parallel or perpendicular to the first alignment direction. The second polarizer is provided between the first electrically-controlled element and the second electrically-controlled element, and has a second absorption axis. An axial direction of the second absorption axis is perpendicular to an axial direction of the first absorption axis. The half-wave plate is provided between the second polarizer and the second electrically-controlled element. The display panel is disposed on the second electrically-controlled element. An out-of-plane phase retardation amount of the compensation film is greater than or equal to −400 nm and less than or equal to −50 nm In order to achieve one or a portion of or all of the objects or other objects, an embodiment of the invention provides a method of driving a display apparatus. The method of driving the display apparatus includes providing the display apparatus, providing a first voltage to a first electrically-controlled element and a second electrically-controlled element of the display apparatus to operate the display apparatus in a wide viewing angle mode, and providing a second voltage and a third voltage to the first electrically-controlled element and the second electrically-controlled element, respectively, to operate the display apparatus in a narrow viewing angle mode. The first voltage is smaller than the second voltage and the third voltage. The display apparatus further includes a backlight module, a first polarizer, a second polarizer, a half-wave plate, and a display panel. The first electrically-controlled element is disposed on the backlight module and includes a first liquid-crystal layer, a first alignment layer, and a second alignment layer. The first liquid-crystal layer is sandwiched between the first alignment layer and the second alignment layer. An included angle between a first alignment direction of the first alignment layer and a second alignment direction of the second alignment layer is between 75 degrees and 105 degrees. The second electrically-controlled element is disposed on the first electrically-controlled element and includes a second liquid-crystal layer, a third alignment layer, and a fourth alignment layer. The second liquid-crystal layer is sandwiched between the third alignment layer and the fourth alignment layer. An included angle between a third alignment direction of the third alignment layer and a fourth alignment direction of the fourth alignment layer is between 165 degrees and 195 degrees. An included angle between the second alignment direction and the third alignment direction is between 30 degrees and 60 degrees, or between 120 degrees and 150 degrees. The first polarizer is provided between the backlight module and the first electrically-controlled element, and has a first absorption axis parallel or perpendicular to the first alignment direction. The second polarizer is provided between the first electrically-controlled element and the second electrically-controlled element, and has a second absorption axis. An axial direction of the second absorption axis is perpendicular to an axial direction of the first absorption axis. The half-wave plate is provided between the second polarizer and the second electrically-controlled element. The display panel is disposed on the second electrically-controlled element.

Based on the above, in the display apparatus of an embodiment of the invention, the electrically-controlled first liquid-crystal layer and second liquid-crystal layer are provided between the backlight module and the display panel. The included angle between the alignment direction on one side of the first liquid-crystal layer and the alignment direction on the other side thereof is between 75 degrees and 105 degrees, and the included angle between the alignment direction on one side of the second liquid-crystal layer and the alignment direction on the other side thereof is between 165 degrees and 195 degrees, wherein the included angle between the alignment direction of the first liquid-crystal layer close to the second liquid-crystal layer and the alignment direction of the second liquid-crystal layer close to the first liquid-crystal layer is between 30 degrees and 60 degrees, or between 120 degrees and 150 degrees, and two opposite sides of the first liquid-crystal layer are provided with two polarizers with absorption axes perpendicular to each other. Through the above configuration, the viewing angle range of the display apparatus in at least one direction may be electrically-controlled and switched to meet different usage situations.

On the other hand, the backlight module is provided with two optical brightness enhancement film, and an included angle between an extending direction of prism structures of each of the two optical brightness enhancement films and a viewing angle control direction of the display apparatus is less than 45 degrees. Accordingly, the anti-peep effect of the display apparatus operated in a narrow viewing angle mode may be improved. A compensation film with an out-of-plane phase retardation amount greater than or equal to −400 nm and less than or equal to −50 nm may also be provided between the first polarizer and the second polarizer to obtain a better anti-peep effect.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
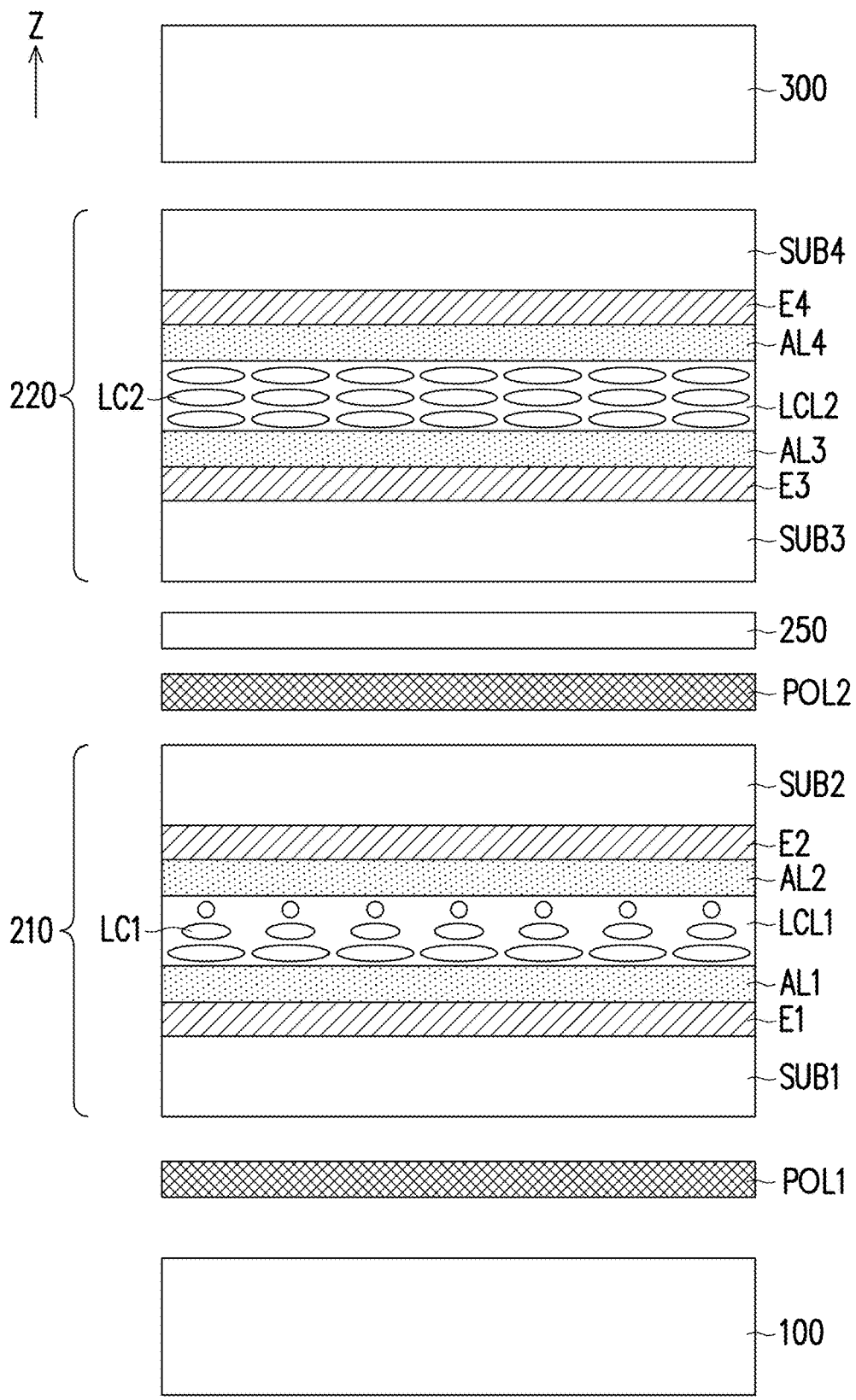
FIG. 1 is a schematic cross-sectional view of a display apparatus according to the first embodiment of the invention.
Figure 2A:
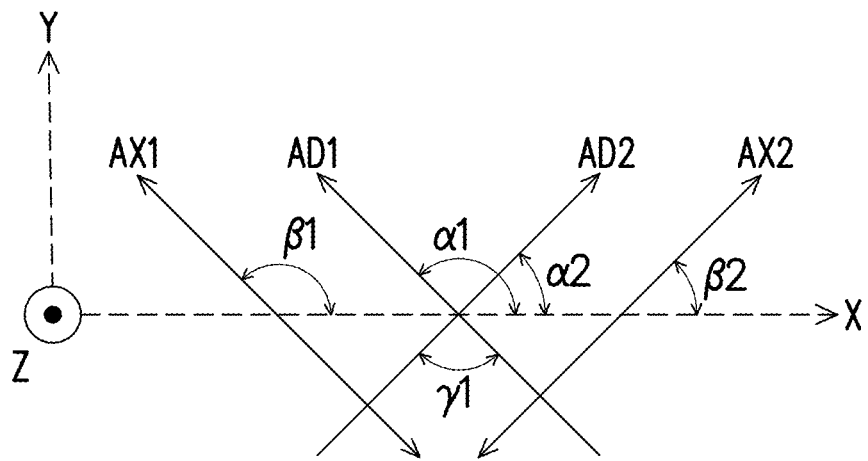
FIG. 2A and FIG. 2B are schematic diagrams showing the arrangement relationship between the alignment direction of the alignment layer, the axial directions of the absorption axes of the polarizers, and the axial direction of the slow axis of the half-wave plate of FIG. 1.
Figure 2B:
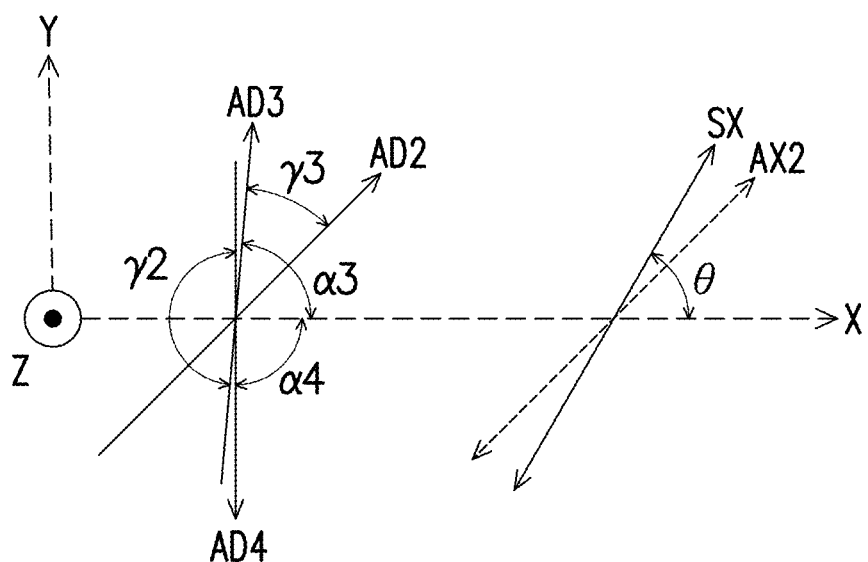
Figure 3A:
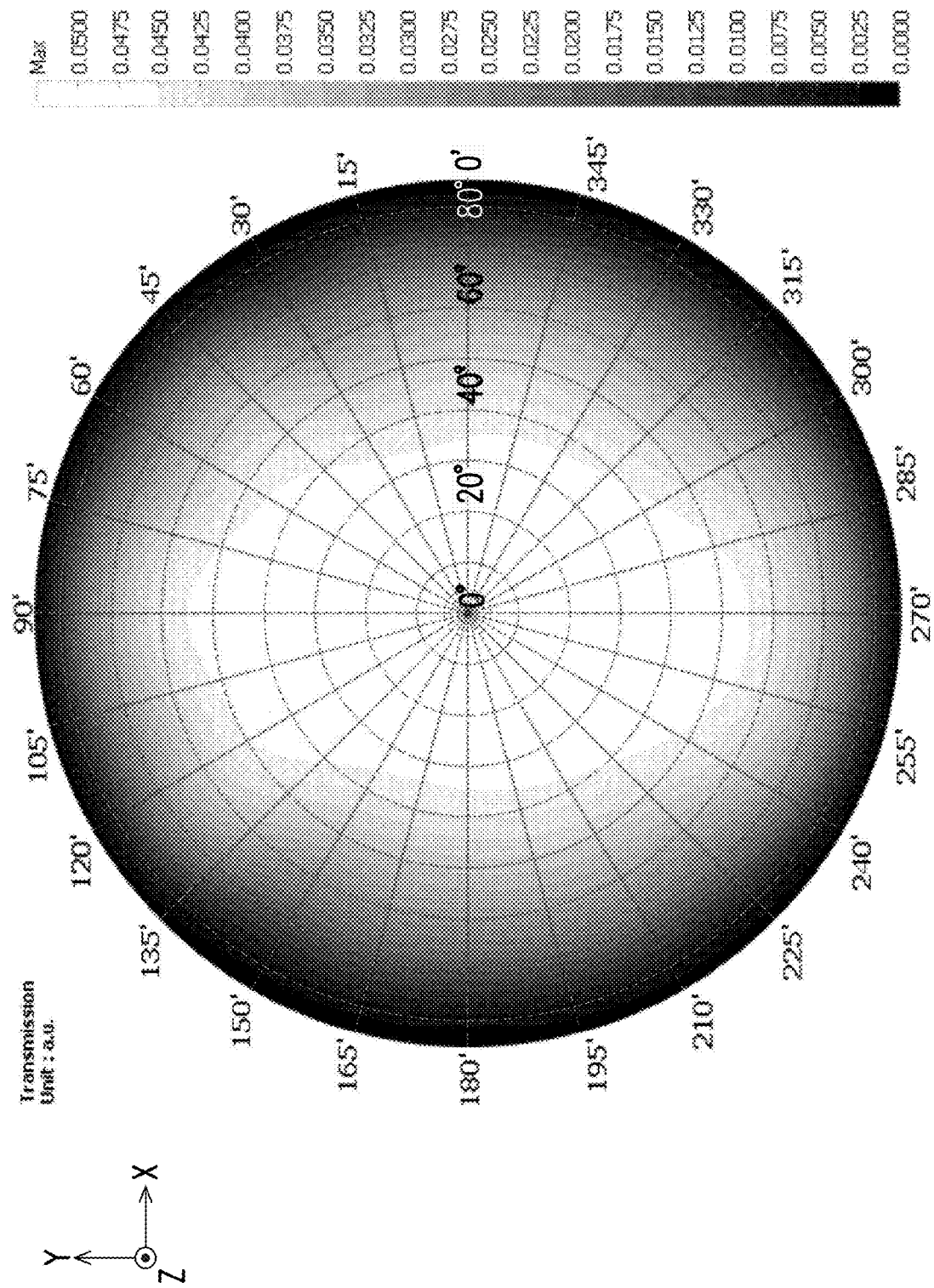
FIG. 3A and FIG. 3B are transmittance distribution diagrams of the display apparatus of FIG. 1 operated in different display modes.
Figure 3B:
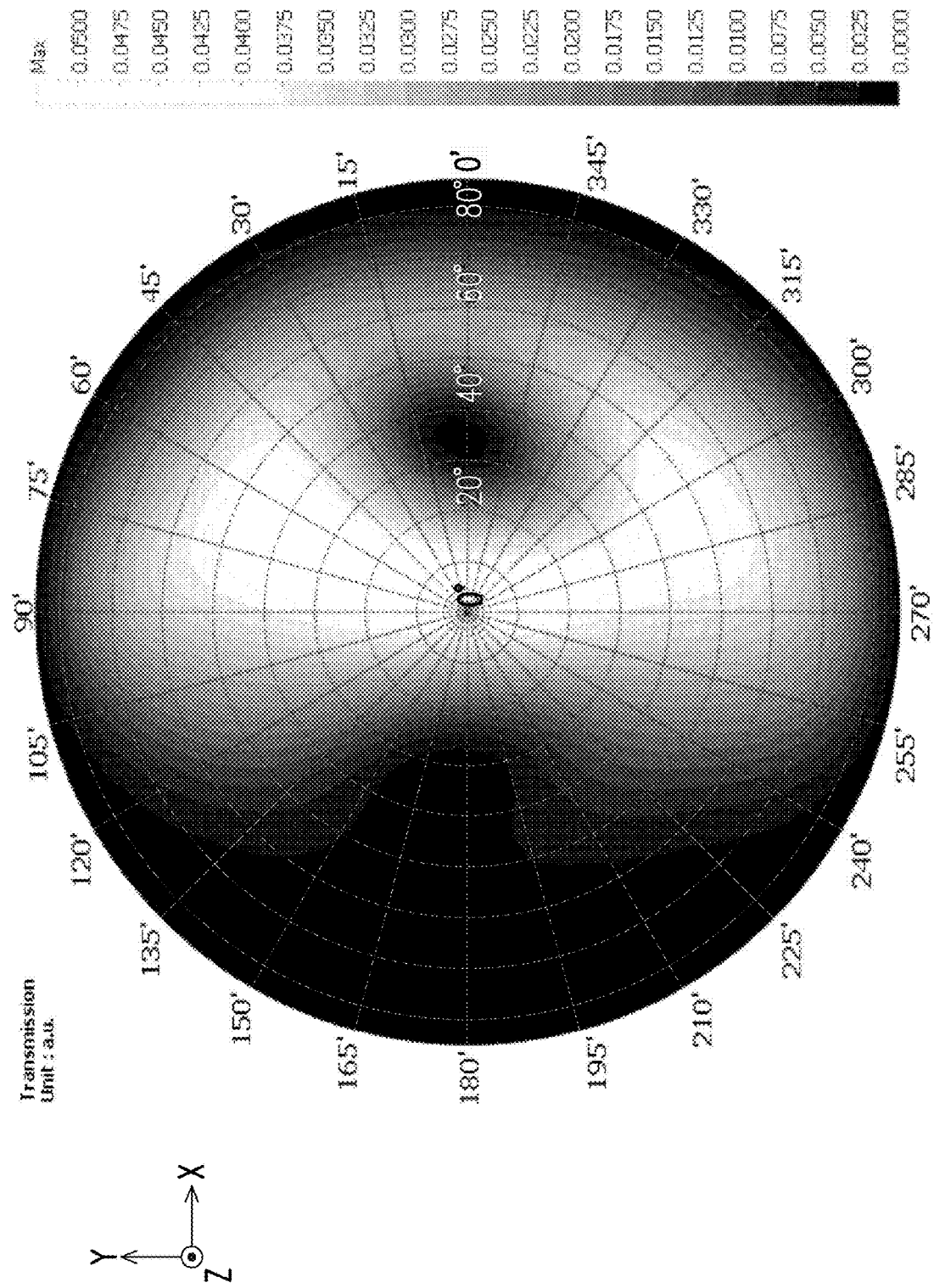
Figure 4:
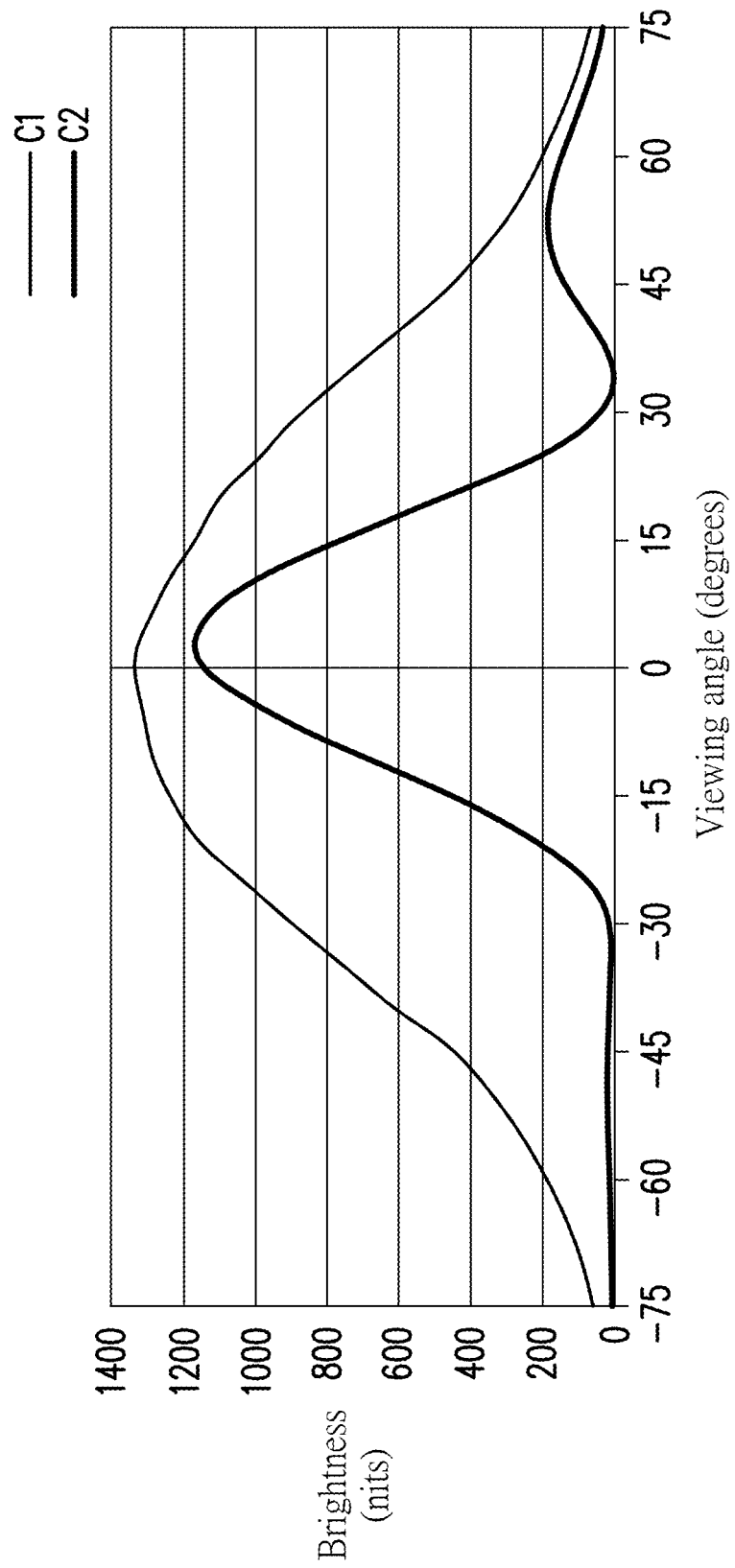
FIG. 4 is a luminance-viewing angle curve diagram of the display apparatus of FIG. 1 operated in different display modes.
Figure 5A:
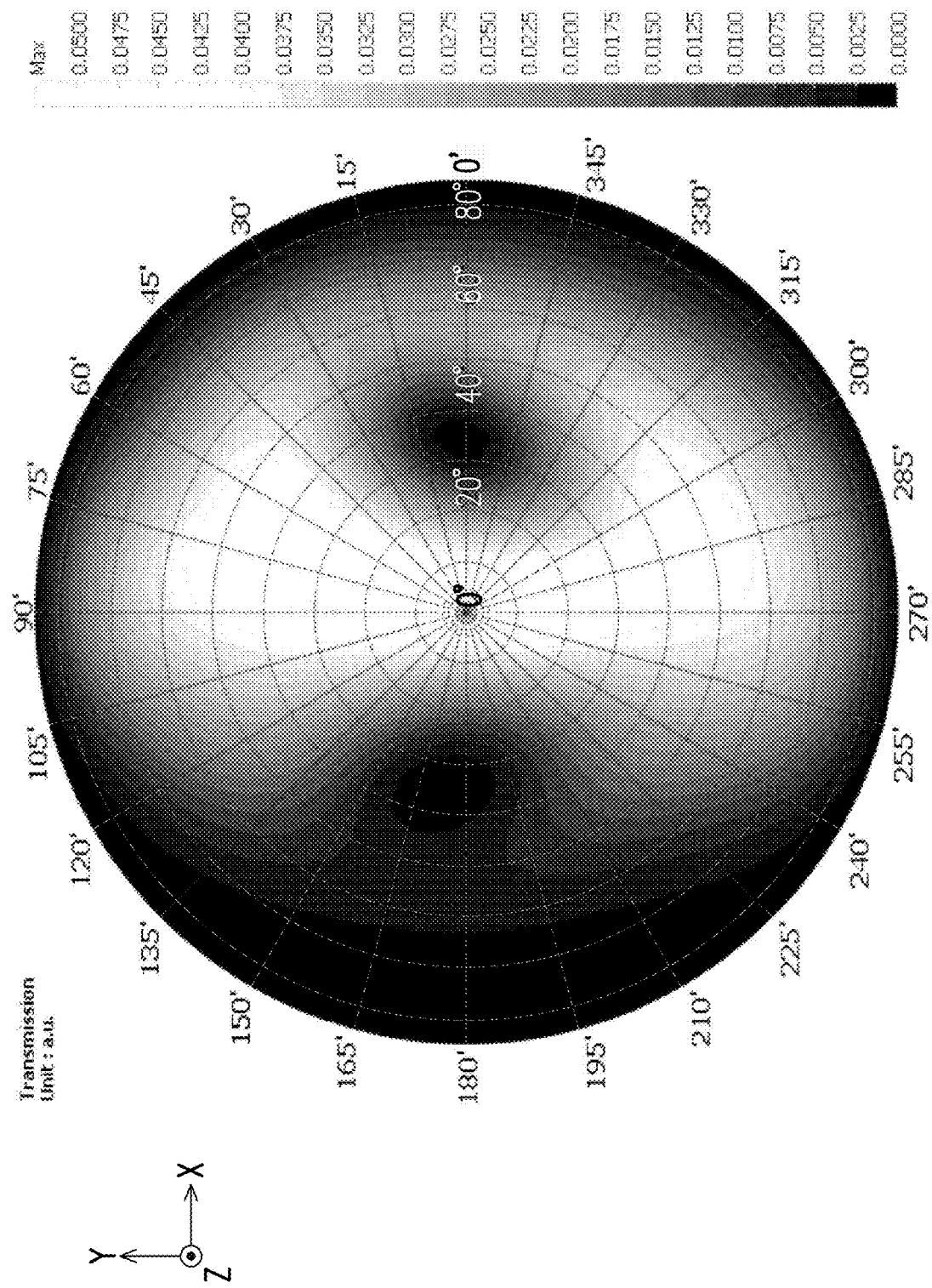
FIG. 5A to FIG. 5D are transmittance distribution diagrams of a display apparatus when the first electrically-controlled element of FIG. 1 is operated at different voltages.
Figure 5B:
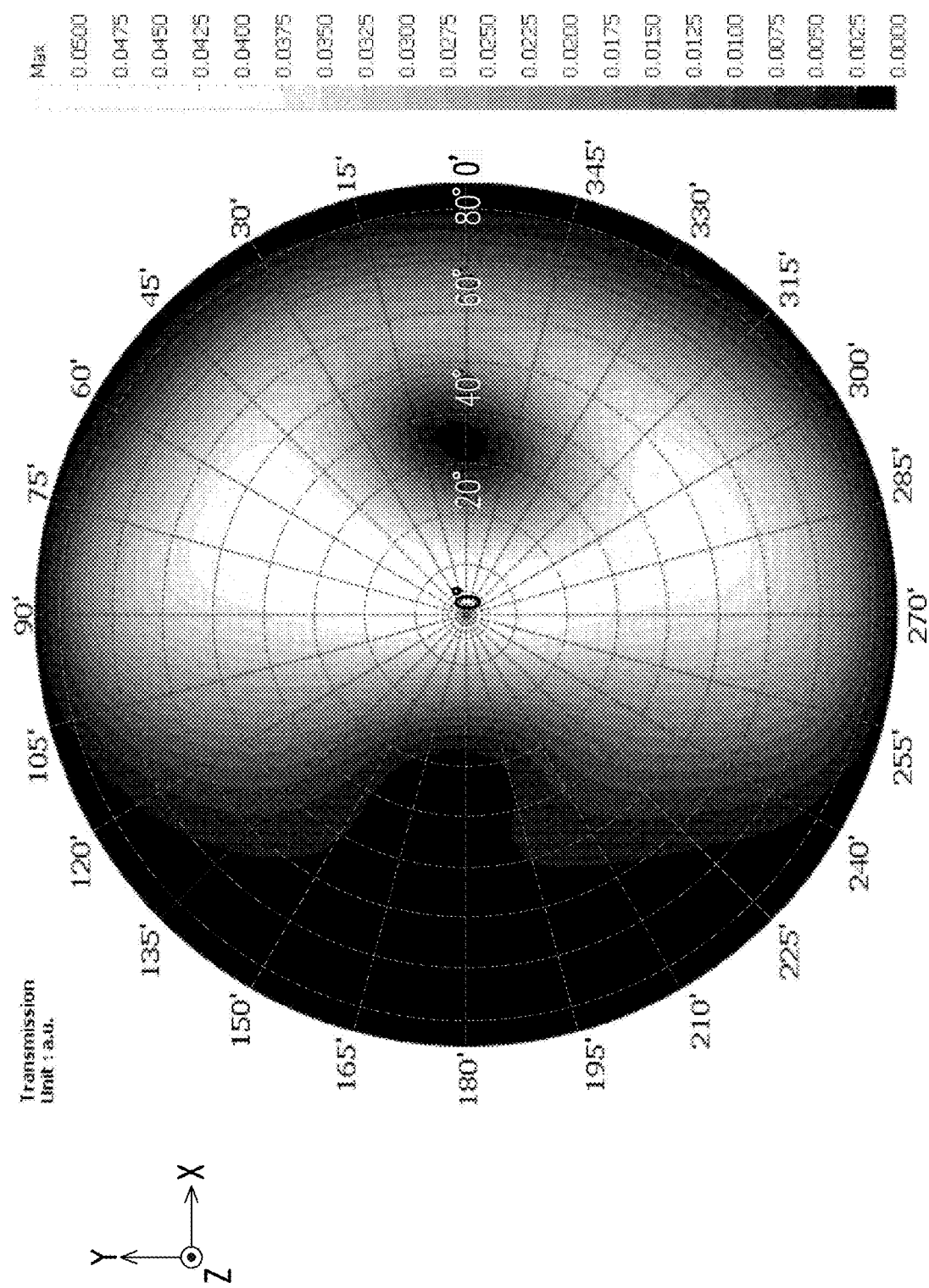
Figure 5C:
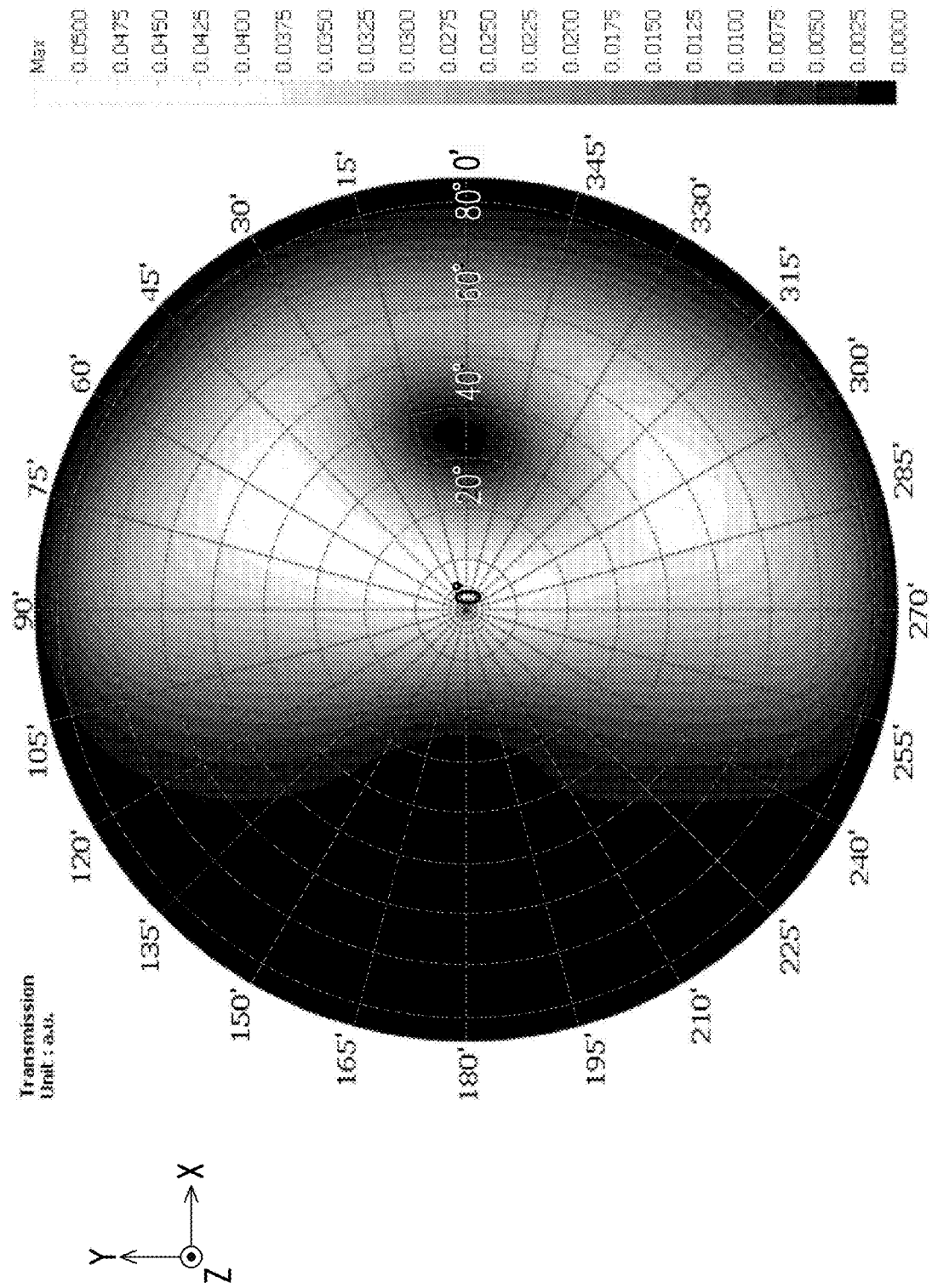
Figure 5D:
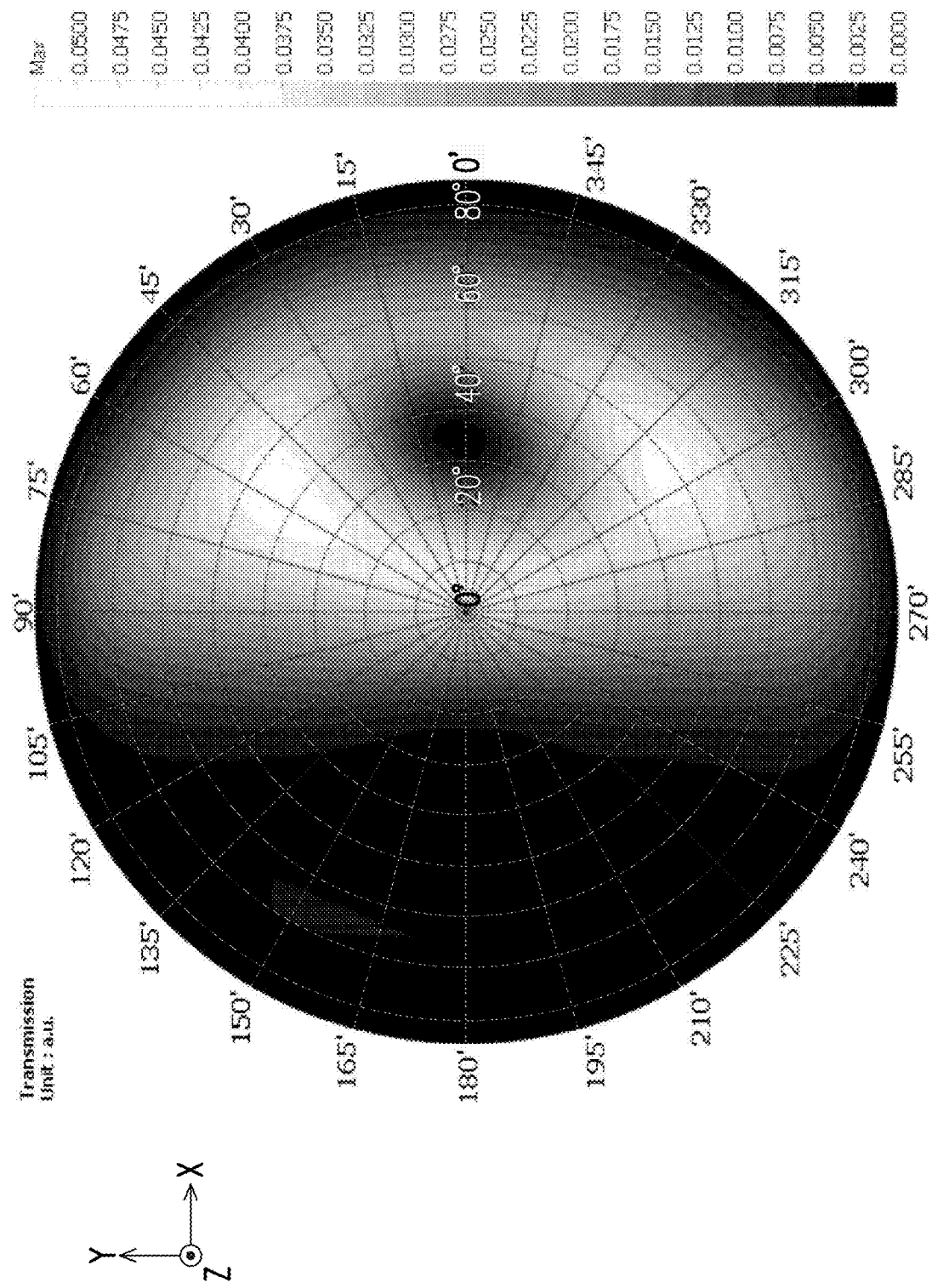

FIG. 1 is a schematic cross-sectional view of a display apparatus according to the first embodiment of the invention. FIG. 2A and FIG. 2B are schematic diagrams showing the arrangement relationship between the alignment direction of the alignment layer, the axial directions of the absorption axes of the polarizers, and the axial direction of the slow axis of the half-wave plate of FIG. 1. FIG. 3A and FIG. 3B are transmittance distribution diagrams (viewing angle characteristics) of the display apparatus of FIG. 1 operated in different display modes. FIG. 4 is a luminance-viewing angle curve diagram of the display apparatus of FIG. 1 operated in different display modes. FIG. 5A to FIG.

Figure 6:
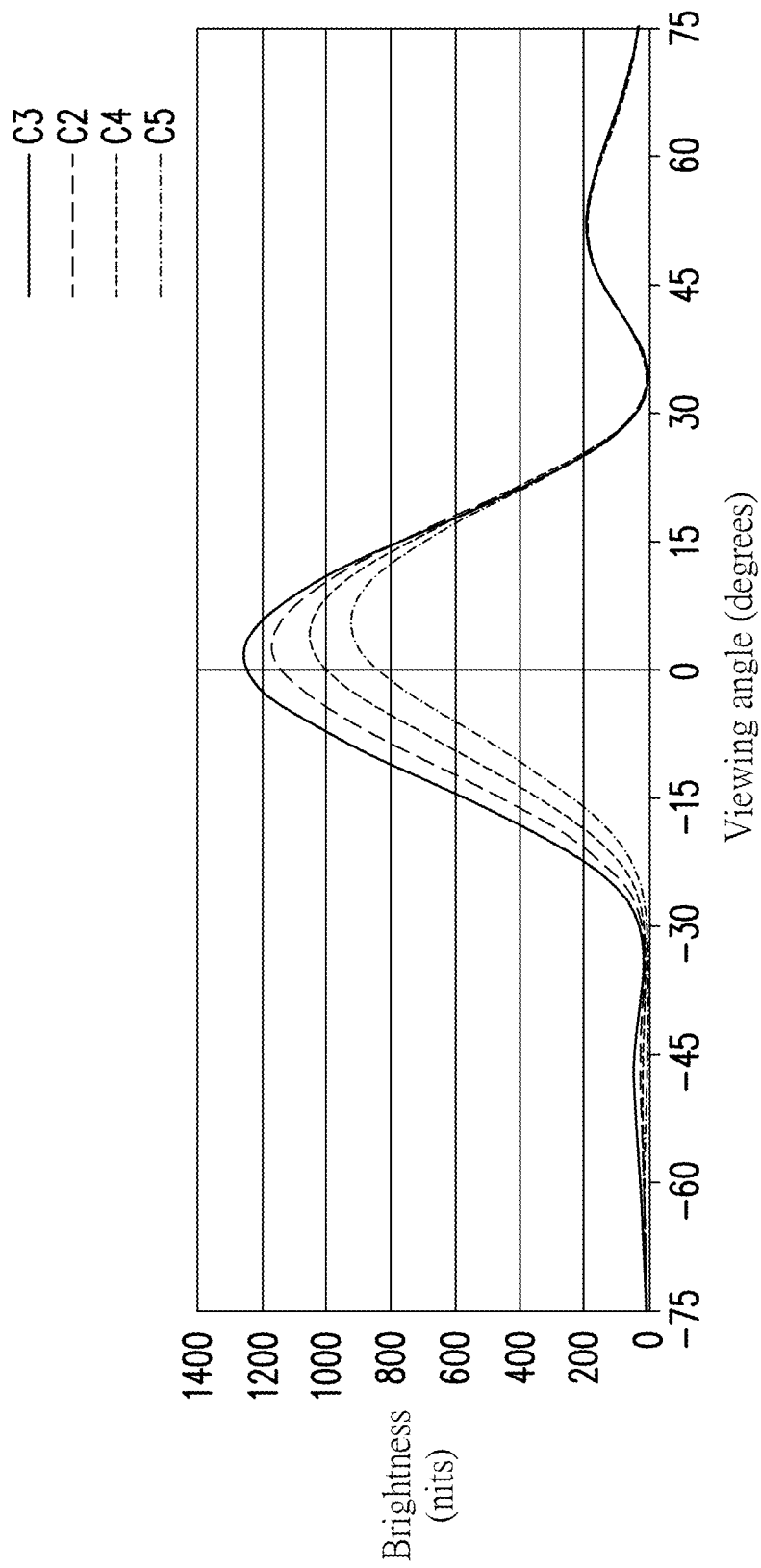
FIG. 6 is a luminance-viewing angle curve diagram of a display apparatus when the first electrically-controlled element of FIG. 1 is operated at different voltages.
Figure 7A:
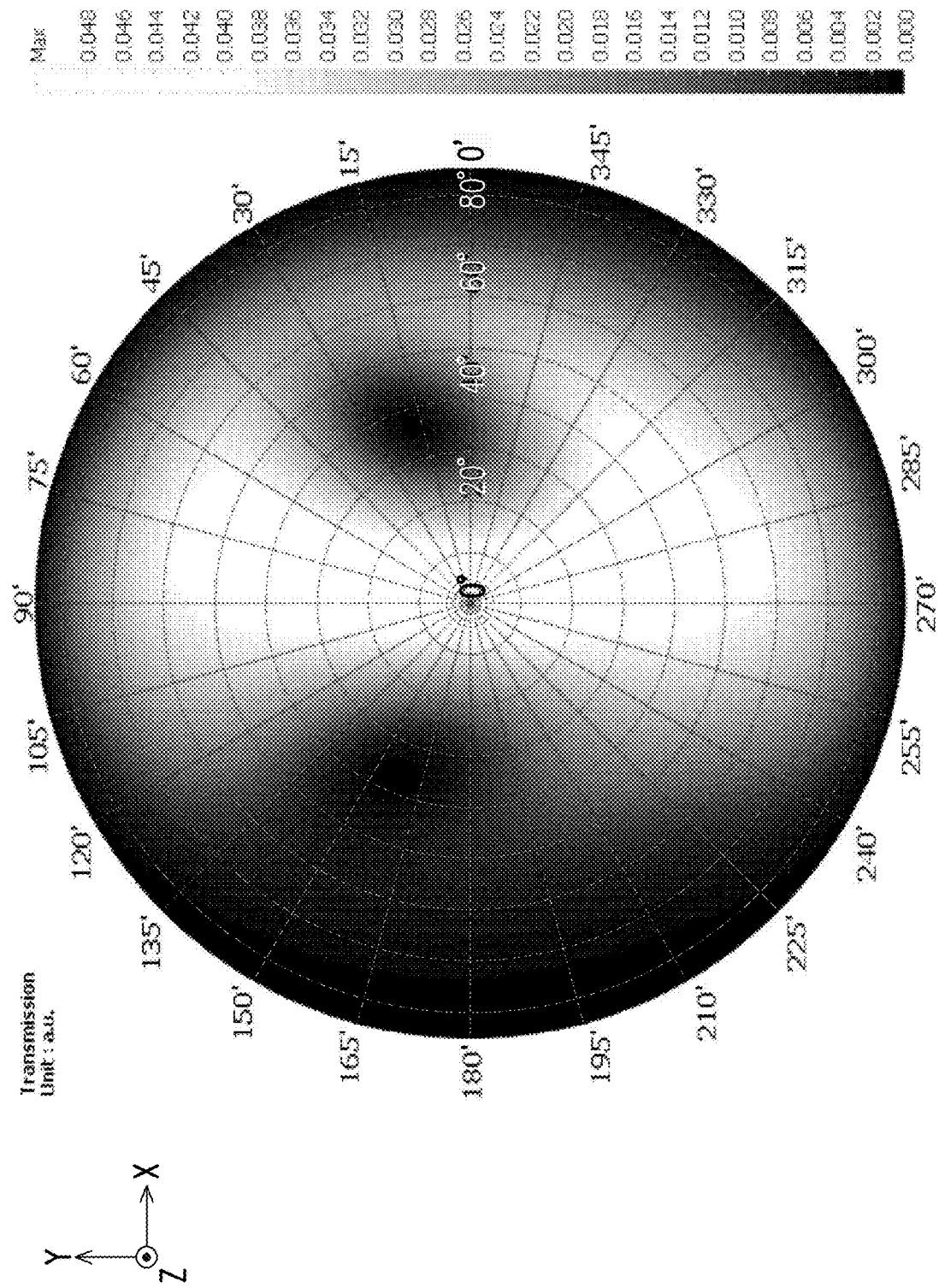
FIG. 7A to FIG. 7C are transmittance distribution diagrams of a display apparatus when the second electrically-controlled element of FIG. 1 is operated at different voltages.
Figure 7B:
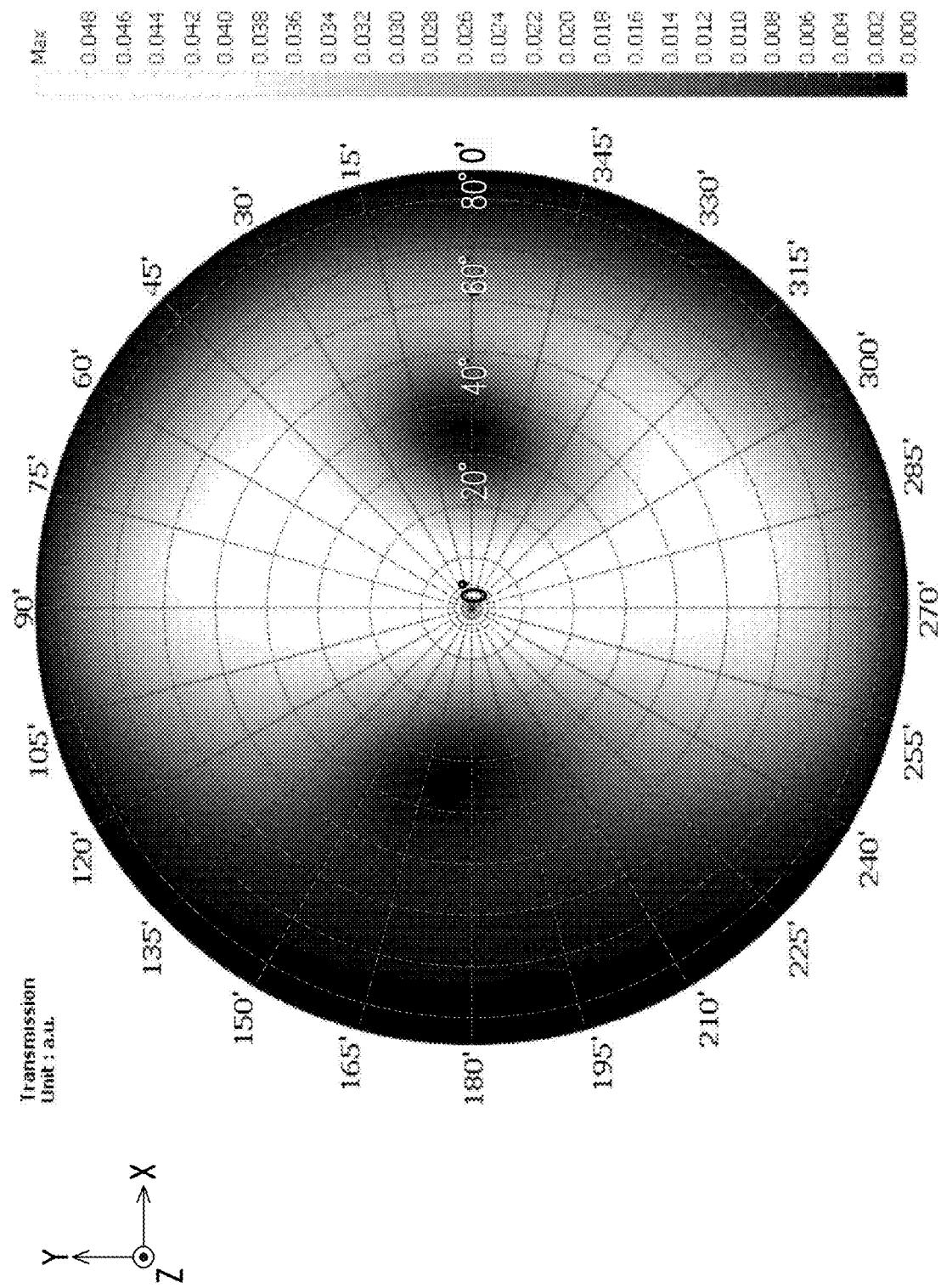
Figure 7C:
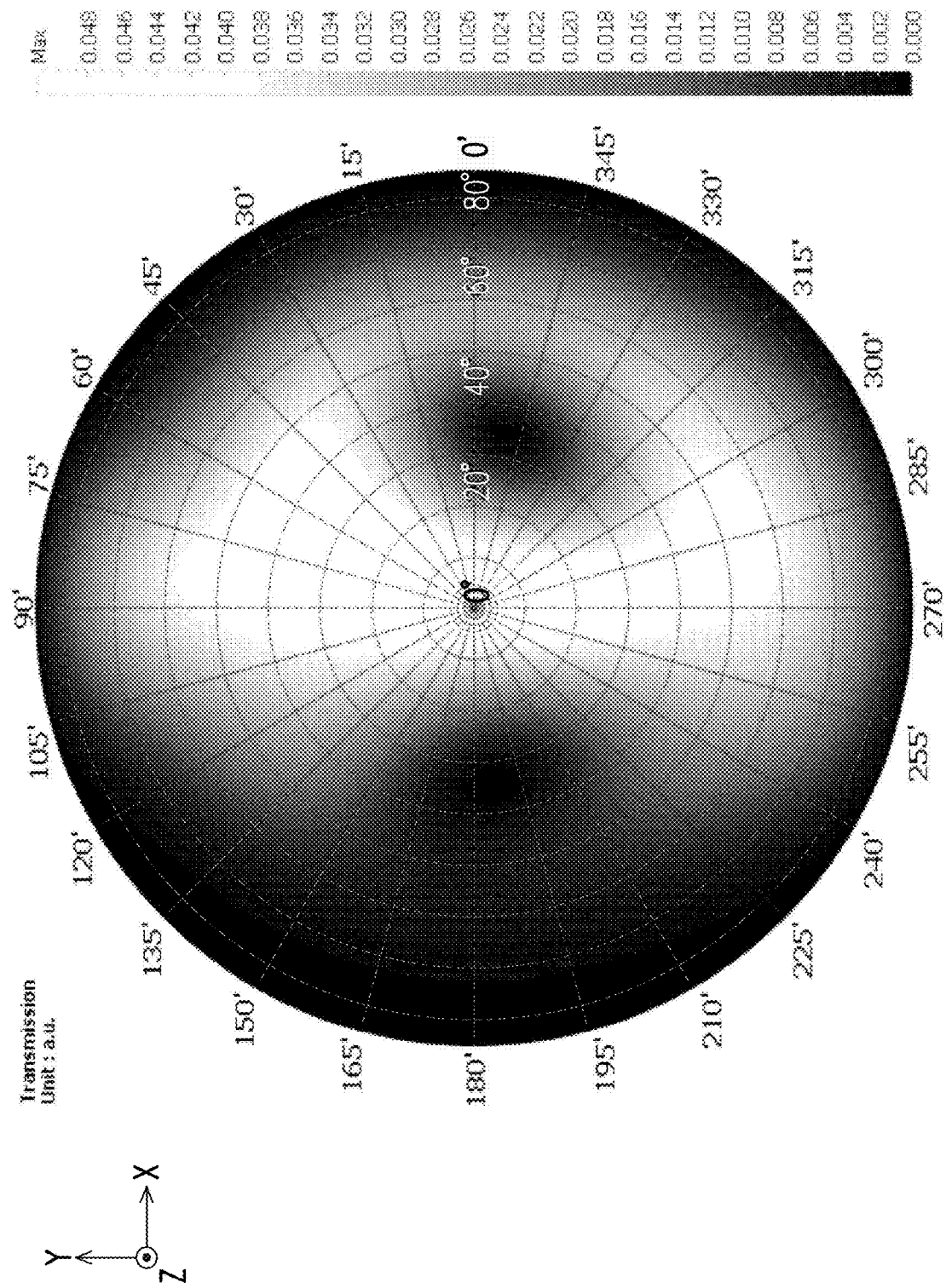
Figure 7D:
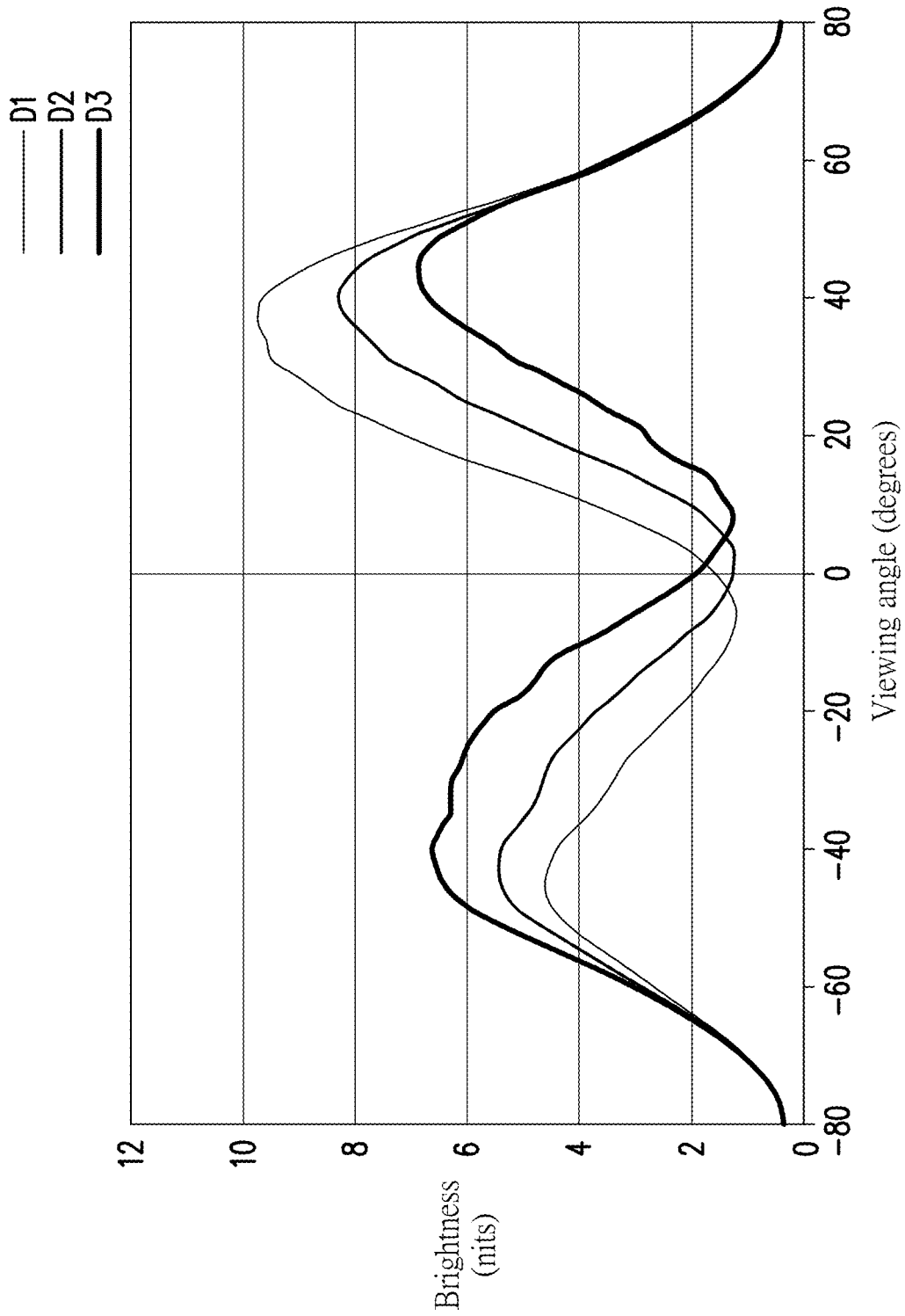
FIG. 7D is a luminance-viewing angle curve diagram of a display apparatus when the second electrically-controlled element of FIG. 1 is operated at different voltages.
Figure 8A:
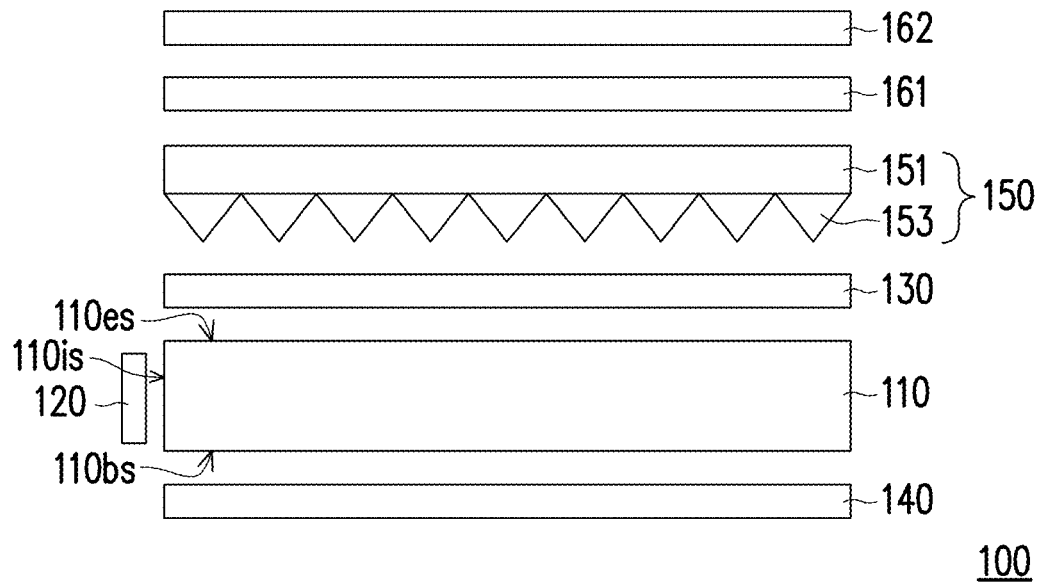
FIG. 8A is a schematic cross-sectional view of the backlight module of FIG. 1.
Figure 8B:
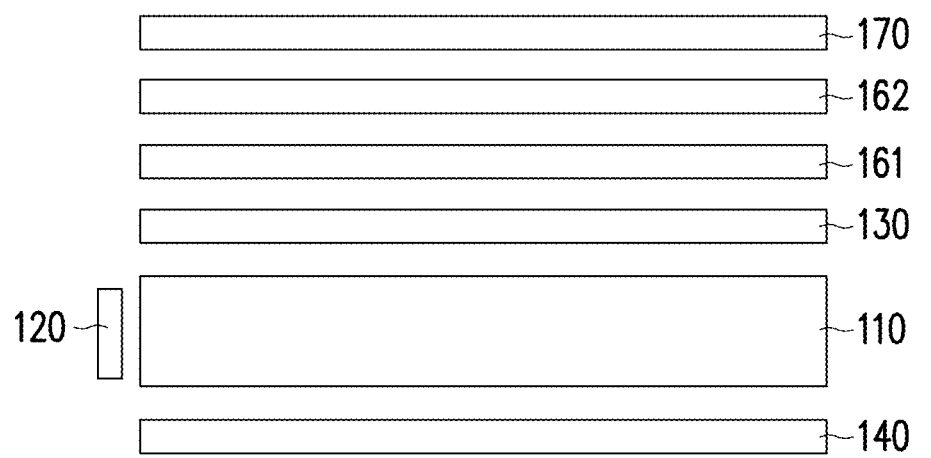
FIG. 8B is a schematic cross-sectional view of another implementation of the backlight module of FIG. 1.

5D are transmittance distribution diagrams of a display apparatus when the first electrically-controlled element of FIG. 1 is operated at different voltages. FIG. 6 is a luminance-viewing angle curve diagram of a display apparatus when the first electrically-controlled element of FIG. 1 is operated at different voltages. FIG. 7A to FIG. 7C are transmittance distribution diagrams of a display apparatus when the second electrically-controlled element of FIG. 1 is operated at different voltages. FIG. 7D is a luminance-viewing angle curve diagram of a display apparatus when the second electrically-controlled element of FIG. 1 is operated at different voltages. FIG. 8A is a schematic cross-sectional view of the backlight module of FIG. 1. FIG. 8B is a schematic cross-sectional view of another implementation of the backlight module of FIG. 1.

Referring to FIG. 1, a display apparatus 10 includes a backlight module 100, a first electrically-controlled element 210, a second electrically-controlled element 220, a first polarizer POL1, a second polarizer POL2, a half-wave plate 250, and a display panel 300. The first electrically-controlled element 210 is disposed on the backlight module 100. The second electrically-controlled element 220 is disposed on the first electrically-controlled element 210, for example, the first electrically-controlled element 210 is disposed between the second electrically-controlled element 220 and the backlight module 100. The display panel 300 is disposed on the second electrically-controlled element 220, for example, the second electrically-controlled element 220 is disposed between the first electrically-controlled element 210 and the display panel 300. The first polarizer POL1 is disposed between the backlight module 100 and the first electrically-controlled element 210. The second polarizer POL2 is disposed between the first electrically-controlled element 210 and the second electrically-controlled element 220. The half-wave plate 250 is disposed between the second polarizer POL2 and the second electrically-controlled element 220. Namely, in the embodiment, the first polarizer POL1, the first electrically-controlled element 210, the second polarizer POL2, the half-wave plate 250, the second electrically-controlled element 220, and the display panel 300 are sequentially disposed on the backlight module 100 in a direction Z (as shown in FIG. 1). The display panel 300 is, for example, a liquid-crystal display panel, or other suitable non-self-luminous display panels.

In detail, the first electrically-controlled element 210 includes a first substrate SUB1, a second substrate SUB2, a first electrode layer E1, a second electrode layer E2, a first alignment layer AL1, a second alignment layer AL2, and a first liquid-crystal layer LCL1. The first electrode layer E1 and the first alignment layer AL1 are provided on a side surface of the first substrate SUB1 facing the second substrate SUB2. The second electrode layer E2 and the second alignment layer AL2 are provided on a side surface of the second substrate SUB2 facing the first substrate SUB1. The first liquid-crystal layer LCL1 is sandwiched between the first alignment layer AL1 and the second alignment layer AL2.

Similarly, the second electrically-controlled element 220 includes a third substrate SUB3, a fourth substrate SUB4, a third electrode layer E3, a fourth electrode layer E4, a third alignment layer AL3, a fourth alignment layer AL4 and a second liquid-crystal layer LCL2. The third electrode layer E3 and the third alignment layer AL3 are provided on a side surface of the third substrate SUB3 facing the fourth substrate SUB4. The fourth electrode layer E4 and the fourth alignment layer AL4 are provided on a side surface of the fourth substrate SUB4 facing the third substrate SUB3. The second liquid-crystal layer LCL2 is sandwiched between the third alignment layer AL3 and the fourth alignment layer AL4.

Referring to FIG. 2A and FIG. 2B, an included angle $\gamma 1$ between a first alignment direction AD1 of the first alignment layer AL1 and a second alignment direction AD2 of the second alignment layer AL2 is between 75 degrees and 105 degrees. An included angle $\gamma 2$ between a third alignment direction AD3 of the third alignment layer AL3 and a fourth alignment direction AD4 of the fourth alignment layer AL4 is between 165 degrees and 195 degrees. An included angle $\gamma 3$ between the second alignment direction AD2 and the third alignment direction AD3 is between 30 degrees and 60 degrees, or between 120 degrees and 150 degrees. In the embodiment, the included angle $\gamma 1$ between the first alignment direction AD1 and the second alignment direction AD2 is, for example, 90 degrees, the included angle $\gamma 2$ between the third alignment direction AD3 and the fourth alignment direction AD4 is, for example, 175 degrees, and the included angle $\gamma 3$ between the second alignment direction AD2 and the third alignment direction AD3 is, for example, 40 degrees.

Namely, a plurality of liquid-crystal molecules LC1 in the first liquid-crystal layer LCL1 are arranged in a twist manner along the direction Z (as shown in FIG. 1), i.e., the first electrically-controlled element 210 may be a twisted nematic (TN)-type electrically-controlled liquid-crystal cell. A plurality of liquid-crystal molecules LC2 in the second liquid-crystal layer LCL2 are generally arranged in parallel with each other (as shown in FIG. 1), i.e., the second electrically-controlled element 220 may be an electrically-controlled birefringence (ECB)-type liquid-crystal cell. Since the first electrically-controlled element 210 and the second electrically-controlled element 220 of the embodiment adopt different liquid-crystal driving modes, the color shift of light coming from the backlight module 100 after passing through these electrically-controlled elements may be effectively suppressed.

In the embodiment, the display apparatus 10 has a first viewing angle control direction parallel to a direction X (for example, perpendicular to the direction Z). More specifically, a viewing angle range of the display apparatus 10 along the first viewing angle control direction is electrically adjustable. In the embodiment, the first alignment direction AD1 of the first alignment layer AL1 is perpendicular to the second alignment direction AD2 of the second alignment layer AL2, wherein an included angle $\alpha 1$ between the first alignment direction AD1 and the direction X is, for example, 135 degrees, and an included angle $\alpha 2$ between the second alignment direction AD2 and the direction X is, for example, 45 degrees, but the invention is not limited thereto. In another embodiment, the included angle $\alpha 1$ may also be 45 degrees, and the included angle $\alpha 2$ may also be 135 degrees.

Preferably, in the embodiment, an axial direction of a first absorption axis AX1 of the first polarizer POL1 may be optionally parallel to the first alignment direction AD1 of the first alignment layer AL1, and an axial direction of the second absorption axis AX2 of the second polarizer POL2 may be optionally parallel to the second alignment direction AD2 of the second alignment layer AL2. Namely, the axial direction of the first absorption axis AX1 is perpendicular to the axial direction of the second absorption axis AX2, an included angle $\beta 1$ between the first absorption axis AX1 and the direction X is 135 degrees, and an included angle $\beta 2$ between the second absorption axis AX2 and the direction X is 45 degree. However, the invention is not limited thereto. In other embodiments, the axial direction of the first absorption axis AX1 of the first polarizer POL1 may be perpendicular to the first alignment direction AD1 of the first alignment layer AL1, and the axial direction of the second absorption axis AX2 of the second polarizer POL2 may be perpendicular to the second alignment direction AD2 of the second alignment layer AL2.

In the embodiment, an included angle α3 between the third alignment direction AD3 of the third alignment layer AL3 and the direction X (i.e., the first viewing angle control direction) is, for example, 85 degrees, and an included angle α4 between the fourth alignment direction AD4 of the fourth alignment layer AL4 and the direction X is, for example, −90 degrees. It should be noted that the negative value of the angle here means that the angle is defined based on the direction X and according to an angle magnitude that deviates from the direction X in a clockwise direction; on the contrary, if the angle is positive, it is defined based on the direction X and according to an angle magnitude that deviates from the direction X in a counterclockwise direction.

Moreover, an included angle θ between a slow axis SX of the half-wave plate 250 and the direction X is between 50 degrees and 80 degrees or between 140 degrees and 170 degrees. In the embodiment, the included angle θ is, for example, 65 degrees. Namely, an axial direction of the slow axis SX of the half-wave plate 250 of the embodiment is between the second absorption axis AX2 of the second polarizer POL2 and the third alignment direction AD3 of the third alignment layer AL3.

Specifically, when the display apparatus 10 is operated in a wide viewing angle mode, a first voltage is provided to the first electrically-controlled element 210 and the second electrically-controlled element 220. When the display apparatus 10 is operated in a narrow viewing angle mode, a second voltage is provided to the first electrically-controlled element 210 and a third voltage is provided to the second electrically-controlled element 220. In particular, the first voltage is lower than the second voltage, and the first voltage is lower than the third voltage. Specifically, the viewing angle range of the wide viewing angle mode is larger than the viewing angle range of the narrow viewing angle mode (for example, in the first viewing angle control direction, the different between the viewing angle range of the wide viewing angle mode and the viewing angle range of the narrow viewing angle mode is greater than 30 degrees), and the viewing angle range is, for example, a viewing angle range corresponding to a brightness greater than a certain threshold brightness (for example, full width at half maximum, FWHM).

In other words, a method of driving the display apparatus 10 includes providing the first voltage to the first electrically-controlled element 210 and the second electrically-controlled element 220 to operate the display apparatus 10 in the wide viewing angle mode, and respectively providing the second voltage and the third voltage to the first electrically-controlled element 210 and the second electrically controlled element 220 to operate the display apparatus 10 in the narrow viewing angle mode.

For example, in the embodiment, when the voltage between the first electrode layer E1 and the second electrode layer E2 of the first electrically-controlled element 210 and the voltage between the third electrode layer E3 and the fourth electrode layer E4 of the second electrically-controlled element 220 are both 0 V (i.e., the first voltage), as shown in FIG. 3A, the viewing angle ranges of the display apparatus 10 at different azimuth angles are substantially the same.

When the voltage between the first electrode layer E1 and the second electrode layer E2 of the first electrically-controlled element 210 is 1.7 V (i.e., the second voltage), and the voltage between the third electrode layer E3 and the fourth electrode layer E4 of the second electrically-controlled element 220 is 3.5 V (i.e., the third voltage), as shown in FIG. 3B, the display apparatus 10 has a narrow viewing angle range in the direction parallel to the direction X, for example, the light emitted to side viewing angle ranges (the left side and the right side of the front view angle direction) may be effectively suppressed. Therefore, the direction parallel to the direction X of FIG. 3B may be defined as the first viewing angle control direction of the display apparatus 10. It should be noted that the transmittance distribution (viewing angle) of the display apparatus 10 at this time is asymmetric with respect to the front viewing direction (e.g., the direction Z).

Further, referring to FIG. 4 at the same time, a curve C1 and a curve C2 are respectively curves of brightness (or luminance) to viewing angle in the horizontal direction (e.g., parallel to the direction X) when the display apparatus 10 is operated in the wide viewing angle mode and the narrow viewing angle mode. When the display apparatus 10 is operated in the narrow viewing angle mode, a narrow viewing angle brightness distribution curve (i.e., the curve C2) thereof clearly shows that the light output in the side viewing angle range above −30 degrees is effectively suppressed, and the viewing angle corresponding to the maximum brightness of the narrow viewing angle brightness distribution curve is deviated from the front viewing angle (i.e., 0 degree) and biased towards a larger viewing angle (as shown in FIG. 4, the viewing angle corresponding to the maximum brightness is, for example, 3 degrees).

It should be noted that the above narrow viewing angle brightness distribution curve has a main viewing angle range (for example, the brightness is greater than 60%) covering the front viewing angle. The main viewing angle range has a peak (for example, the maximum brightness), and the peak is moved along the direction X as the applied voltage of the first electrically-controlled element 210 is changed. In other words, the method of driving the display apparatus 10 may further includes tuning the applied voltage (i.e., the second voltage) of the first electrically-controlled element 210 when the display apparatus 10 is operated in the narrow viewing angle mode.

For example, referring to FIG. 1 and FIG. 5A to FIG. 5D, FIG. 5A to FIG. 5D are respectively transmittance distribution diagrams of the display apparatus 10 when the applied voltage of the first electrically-controlled element 210 is 1.6 V, 1.7 V, 1.8 V, and 1.9 V, and the applied voltage of the second electrically-controlled element 220 is 3.5 V. According to the figures, it is known that the higher the applied voltage of the first electrically-controlled element 210 is, the more the viewing angle range located on the left side of the front view angle direction is reduced toward the direction X. Referring to FIG. 6, a curve C3, a curve C2, a curve C4, and a curve C5 respectively show brightness-viewing angle distributions of the display apparatus 10 along the direction X (or the first viewing angle control direction) of FIG. 5A to FIG. 5D including the front viewing angle when the first electrically-controlled element 210 is applied with voltages of 1.6 V, 1.7 V, 1.8 V, and 1.9 V. The viewing angle corresponding to the peak of the narrow viewing angle brightness distribution curve is moved along the direction X as the applied voltage (i.e., the second voltage) of the first electrically-controlled element 210 is increased, i.e., the viewing angle corresponding to the peak may be increased.

It should be noted that when the display apparatus 10 is used in vehicle, due to design requirements of different vehicle models, the relative position relationship between the display apparatus and the driver may be different. Therefore, by adjusting the applied voltage of the first electrically-controlled element 210, the viewing angle control range may be optimized according to the configuration requirements of different vehicle models. In addition, as different drivers have different heights, the angle of viewing the display apparatus 10 is also different. Therefore, the viewing angle control range may be optimized for drivers of different heights by adjusting the applied voltage of the second electrically-controlled element 220. In other words, the method of driving the display apparatus 10 may further includes tuning the applied voltage (i.e., the third voltage) of the second electrically-controlled element 220 when the display apparatus 10 is operated in the narrow viewing angle mode.

For example, referring to FIG. 1 and FIG. 7A to FIG. 7C, wherein FIG. 7A to FIG. 7C are respectively transmittance distribution diagrams of the display apparatus 10 when the second electrically-controlled element 220 is applied with voltages of 3.1 V, 3.5 V, and 3.9 V, and the first electrically-controlled element 210 is applied with a voltage of 1.6 V. According to the figures, it is known that when the applied voltage of the second electrically-controlled element 220 is 3.1 V, a non-viewing area (for example, the brightness is less than 20%) of the display apparatus 10 within the viewing angle of 50 degrees may be deviated from the front viewing angle direction along a direction Y (for example, the direction Y is perpendicular to the direction X and direction Z), and may be moved toward the opposite direction of the direction Y as the applied voltage is increased. When the applied voltage is 3.9 V, the non-viewing area of the display apparatus 10 within the viewing angle of 50 degrees may be deviated from the front viewing angle direction along the opposite direction of the direction Y. Namely, by adjusting the applied voltage of the second electrically-controlled element 220, the display apparatus 10 may also have a second viewing angle control direction parallel to the direction Y.

Referring to FIG. 7D at the same time, a curve D1, a curve D2, and a curve D3 respectively show brightness-viewing angle distributions (i.e., narrow viewing angle brightness distribution curves) of the display apparatus 10 along the direction Y (or the second viewing angle control direction) of FIG. 7A to FIG. 7C including a horizontal viewing angle of 35 degrees when the second electrically-controlled element 220 is applied with voltages of 3.1 V, 3.5 V, and 3.9 V. The viewing angle corresponding to a valley of the narrow viewing angle brightness distribution curve may be moved along the direction Y as the applied voltage (i.e., the third voltage) of the second electrically-controlled element 220 is increased.

Referring to FIG. 8A, for example, the backlight module 100 may include a light guide plate 110, a light source 120, a diffuser 130, a reflector 140, a prism sheet 150, and two optical brightness enhancement films 161 and 162. The light guide plate 110 has a light incident surface 110is, and a bottom surface 110bs and a light-emitting surface 110es connected to the light incident surface 110is and opposite to each other. The light source 120 is disposed at a side of the light incident surface 110is of the light guide plate 110. The reflector 140 is disposed on one side of the bottom surface 110bs of the light guide plate 110. The diffuser 130, the prism sheet 150, and the two optical brightness enhancement films 161 and 162 are sequentially disposed on one side of the light-emitting surface 110es of the light guide plate 110, wherein the prism sheet 150 includes a substrate 151 and a plurality of prism structures 153, and these prism structures 153 are disposed on a surface of the substrate 151 facing the light guide plate 110. To be specific, the backlight module 100 of the embodiment may be a light-collecting-type backlight module, but the invention is not limited thereto. In another embodiment, as shown in FIG. 8B, the backlight module 100A may also adopt a viewing angle control sheet 170 (for example, 3M LCF) to replace the prism sheet 150 of FIG. 8A, wherein the viewing angle control sheet 170 is disposed on one side of the two optical brightness enhancement films 161 and 162 away from the light guide plate 110. In another embodiment, the backlight module may also be a backlight module commonly used in a vehicle-mounted display apparatus or a general display apparatus, which is not limited by the invention.

Other embodiments are provided below to describe the invention in detail, wherein the same reference numerals denote the same or like components, and descriptions of the same technical contents are omitted. The aforementioned embodiments may be referred for descriptions of the omitted parts, and detailed descriptions thereof are not repeated in the following embodiments.

Figure 9:
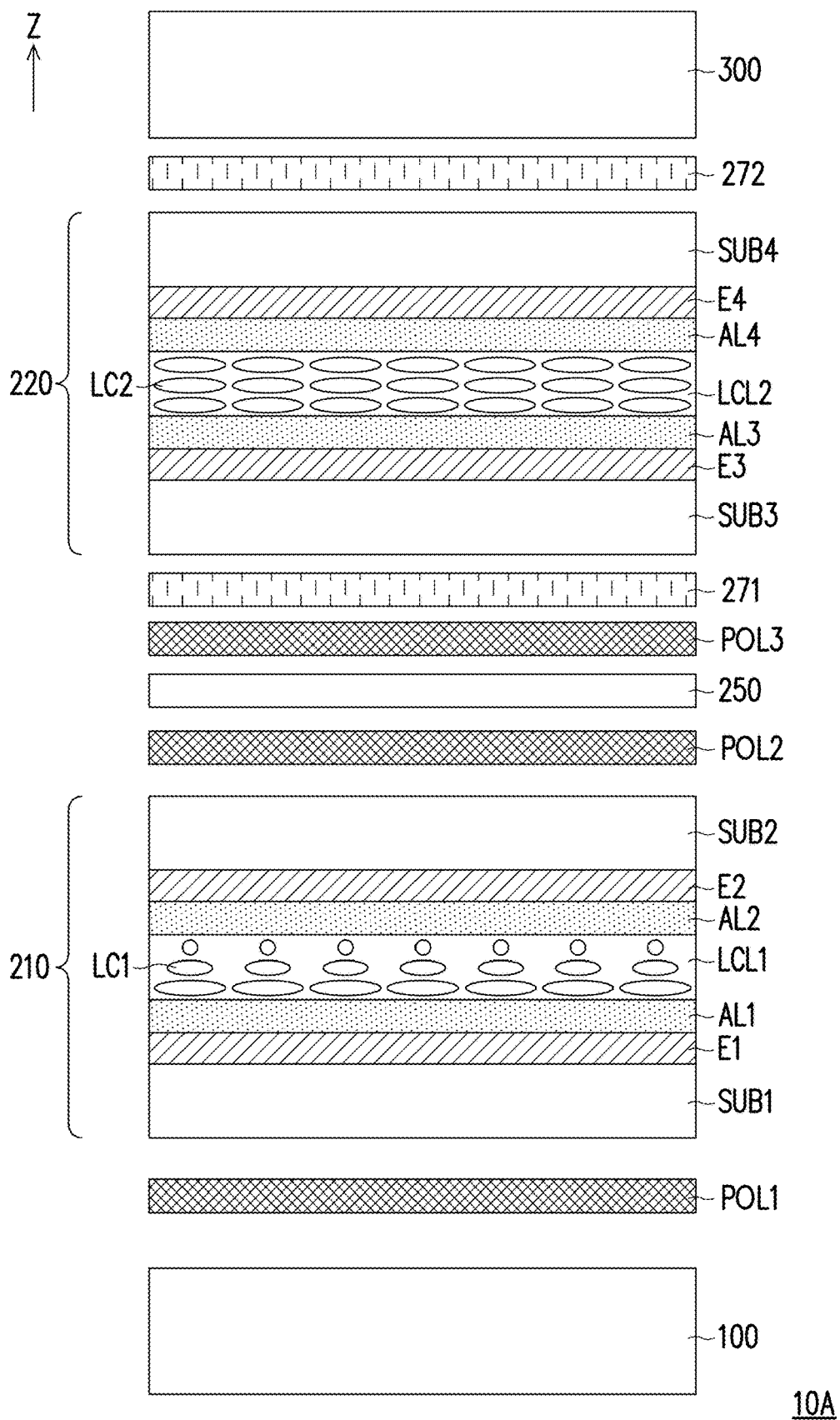
FIG. 9 is a schematic cross-sectional view of a display apparatus according to the second embodiment of the invention.
Figure 10A:
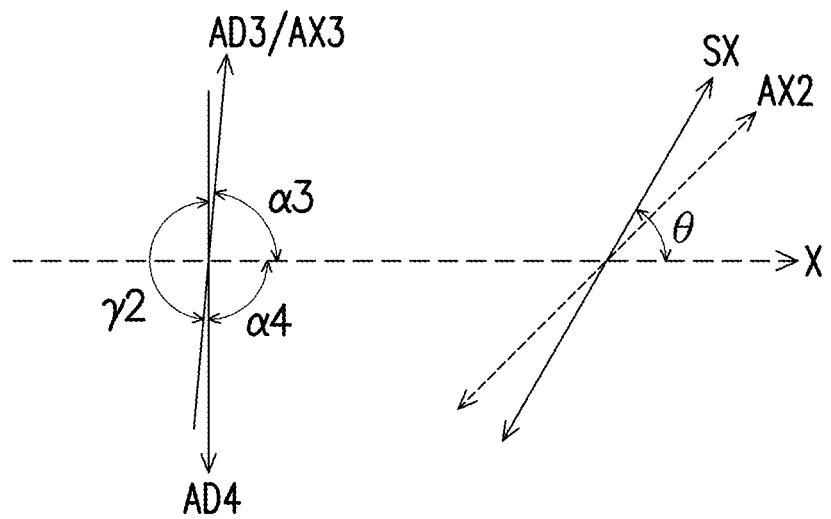
FIG. 10A is a schematic diagram illustrating the arrangement relationship between the alignment direction of the alignment layer, the axial directions of the absorption axes of the polarizers, and the axial direction of the slow axis of the half-wave plate of FIG. 9.
Figure 10B:
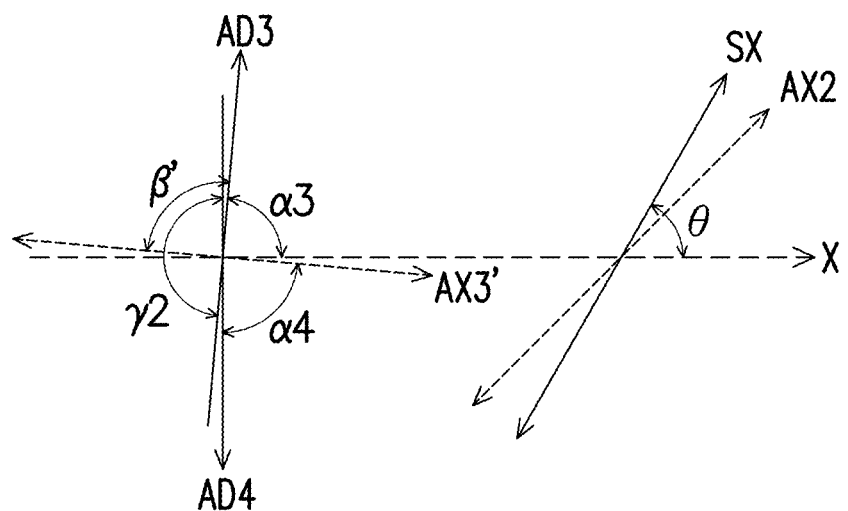
FIG. 10B is a schematic diagram illustrating another arrangement relationship between the alignment direction of the alignment layer, the axial directions of the absorption axes of the polarizers, and the axial direction of the slow axis of the half-wave plate of FIG. 9.
Figure 11A:
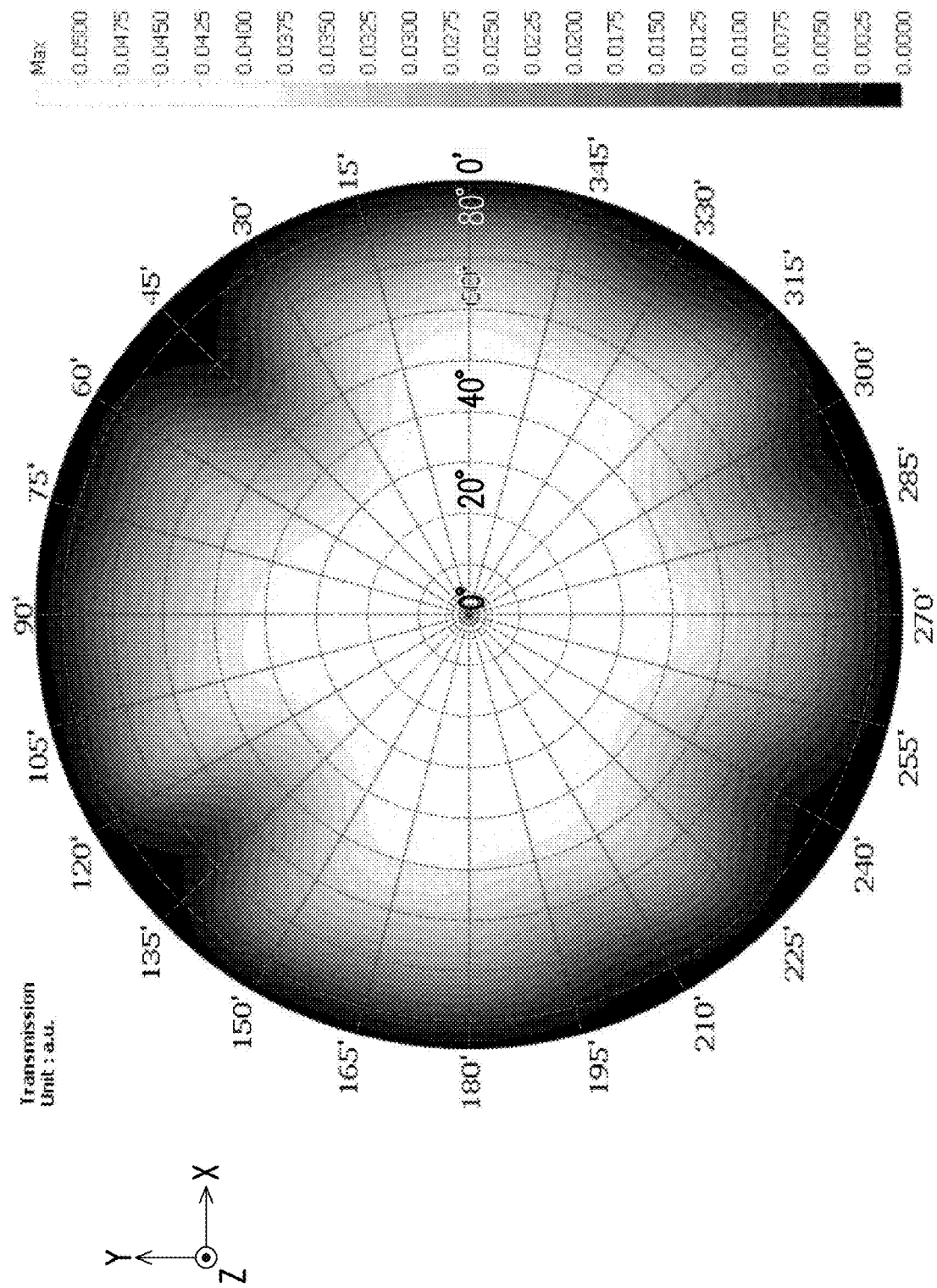
FIG. 11A and FIG. 11B are transmittance distribution diagrams of the display apparatus of FIG. 9 operated in different display modes.
Figure 11B:
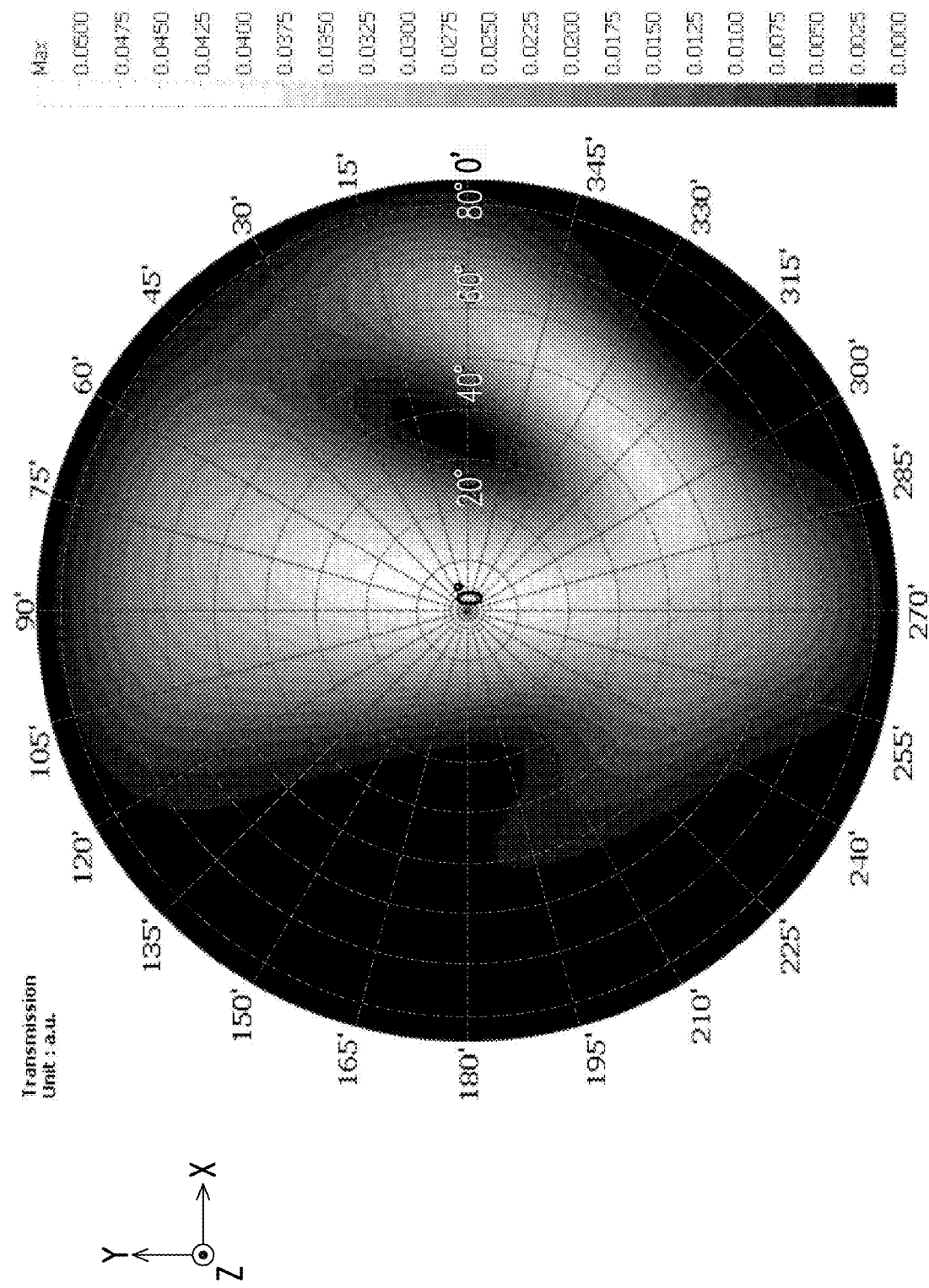

FIG. 9 is a schematic cross-sectional view of a display apparatus according to the second embodiment of the invention. FIG. 10A is a schematic diagram illustrating the arrangement relationship between the alignment direction of the alignment layer, the axial directions of the absorption axes of the polarizers, and the axial direction of the slow axis of the half-wave plate of FIG. 9. FIG. 10B is a schematic diagram illustrating another arrangement relationship between the alignment direction of the alignment layer, the axial directions of the absorption axes of the polarizers, and the axial direction of the slow axis of the half-wave plate of FIG. 9. FIG. 11A and FIG. 11B are transmittance distribution diagrams of the display apparatus of FIG. 9 respectively operated in a wide viewing angle mode and a narrow viewing angle mode.

Referring to FIG. 9 and FIG. 10A, a difference between a display apparatus 10A of the embodiment and the display apparatus 10 of FIG. 1 is that the display apparatus 10A further includes a third polarizer POL3, a first compensation film 271, and a second compensation film 272, wherein the third polarizer POL3 is disposed between the half-wave plate 250 and the second electrically-controlled element 220, the first compensation film 271 is disposed between the third polarizer POL3 and the second electrically-controlled element 220, and the second compensation film 272 is disposed between the second electrically-controlled element 220 and the display panel 300.

It should be noted that the included angle between the axial direction of a third absorption axis AX3 of the third polarizer POL3 and the third alignment direction AD3 of the third alignment layer AL3 is between −15 degrees and 15 degrees or between 75 degrees and 105 degrees. In the embodiment, the third absorption axis AX3 is, for example, parallel to the third alignment direction AD3. In another embodiment, as shown in FIG. 10B, an included angle β' between a third absorption axis AX3' and the third alignment direction AD3 may also be 90 degrees. Since the relative arrangement relationship between the first alignment direction, the second alignment direction, the third alignment direction AD3, the fourth alignment direction AD4, the axial direction of the first absorption axis, the axial direction of the second absorption axis AX2 and the axial direction of the slow axis SX of the half-wave plate 250 of the present embodiment is similar to that of the display apparatus 10 of FIG. 1, detailed description thereof may be deduced by referring to related paragraphs of the aforementioned embodiments, which will not be repeated.

Moreover, the first compensation film 271 and the second compensation film 272 are, for example, biaxial compensation films (B-plate) or C-plate compensation films, and the sum of out-of-plane phase retardation amounts (Rth) of the first compensation film 271 and the second compensation film 272 is between 200 nm and 1000 nm. For example, in the embodiment, the first compensation film 271 and the second compensation film 272 are, for example, biaxial compensation films, and the sum of the out-of-plane phase retardation amounts is, for example, 290 nm.

Referring to FIG. 11A and FIG. 11B at the same time, it is particularly noted that, in the display apparatus 10A of the embodiment, the anti-peep performance of the display apparatus 10A in the first viewing angle control direction may be improved by setting the third polarizer POL3, and the arrangement of the first compensation film 271 and the second compensation film 272 may expand the anti-peep range of the display apparatus 10A.

Figure 12:
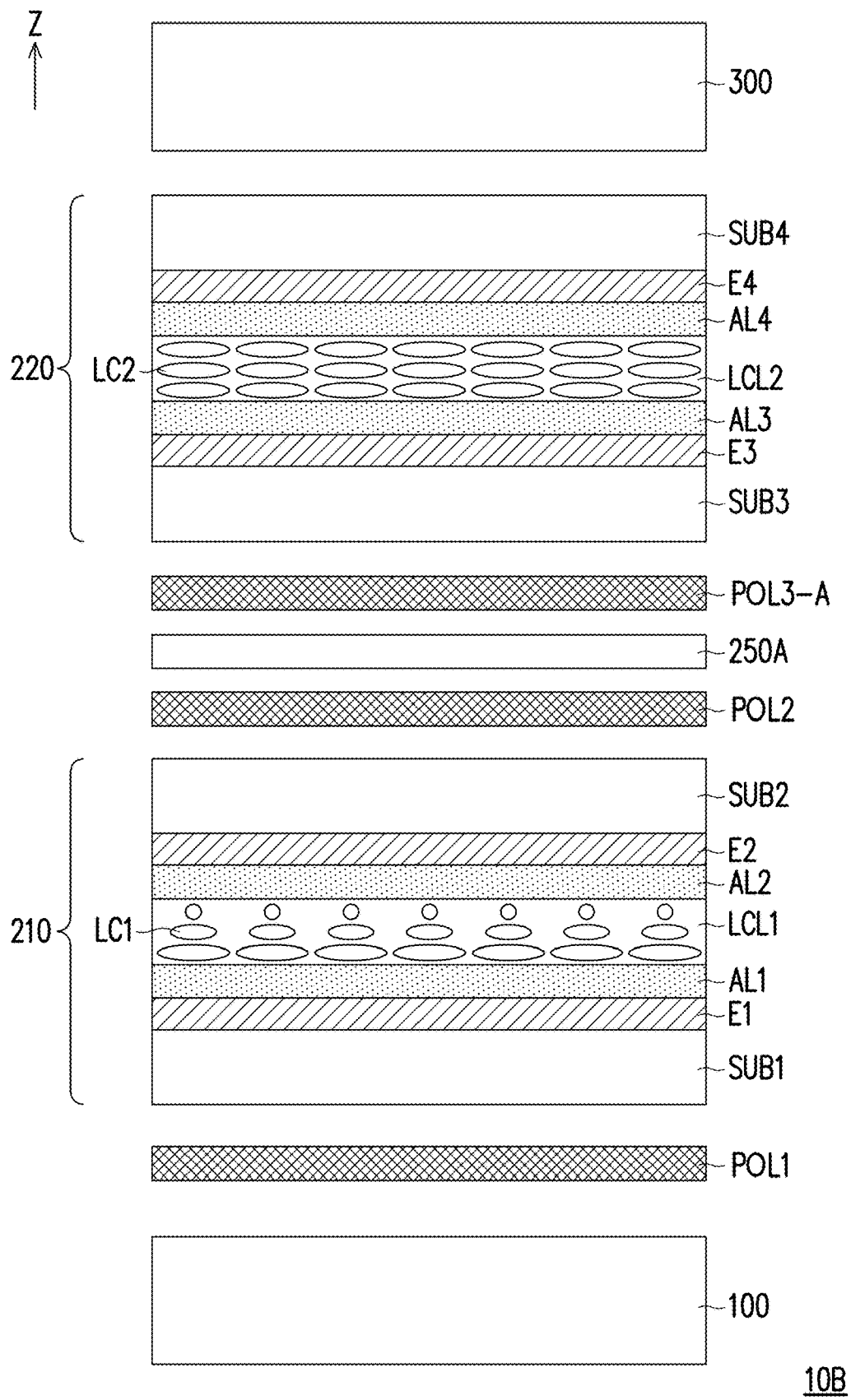
FIG. 12 is a schematic cross-sectional view of a display apparatus according to the third embodiment of the invention.
Figure 13:
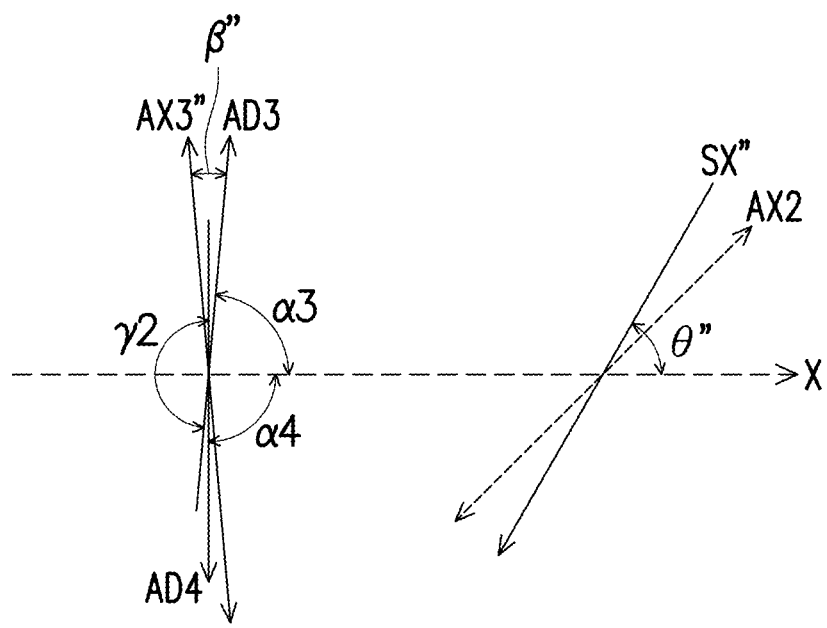
FIG. 13 is a schematic diagram illustrating the arrangement relationship between the alignment direction of the alignment layer, the axial directions of the absorption axes of the polarizers, and the axial direction of the slow axis of the half-wave plate of FIG. 12.
Figure 14A:
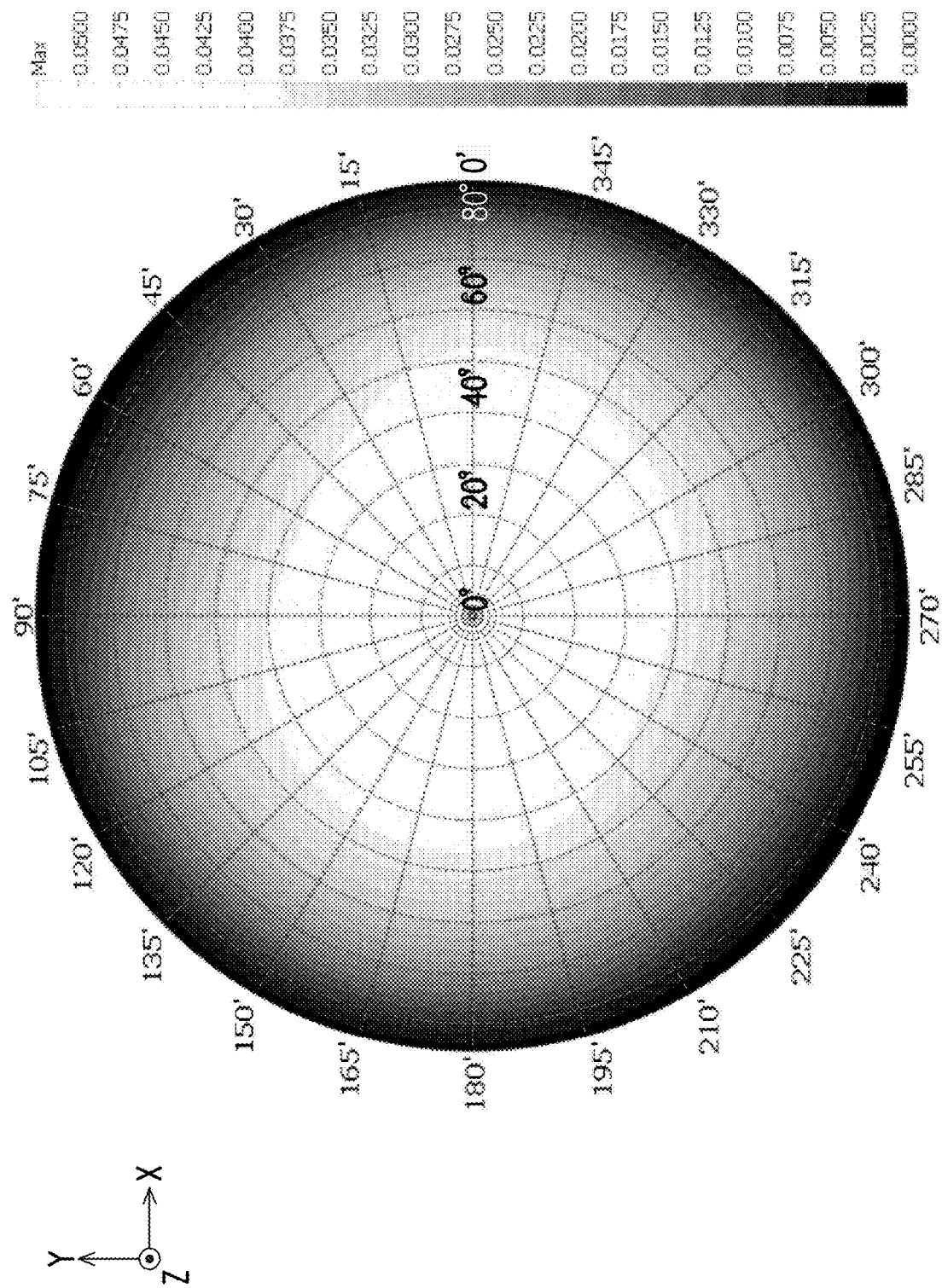
FIG. 14A and FIG. 14B are transmittance distribution diagrams of the display apparatus of FIG. 12 operated in different display modes.
Figure 14B:
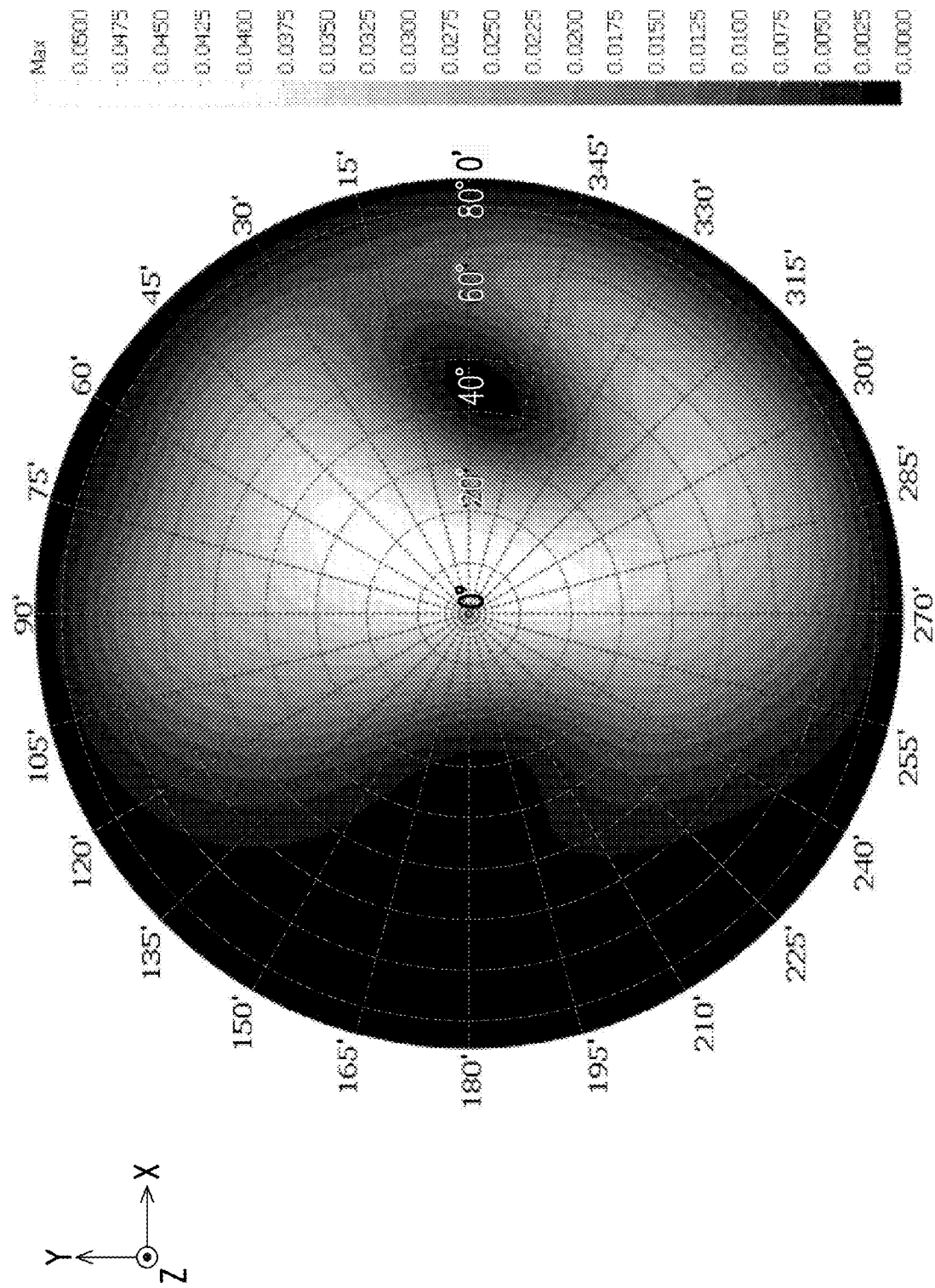
Figure 15:
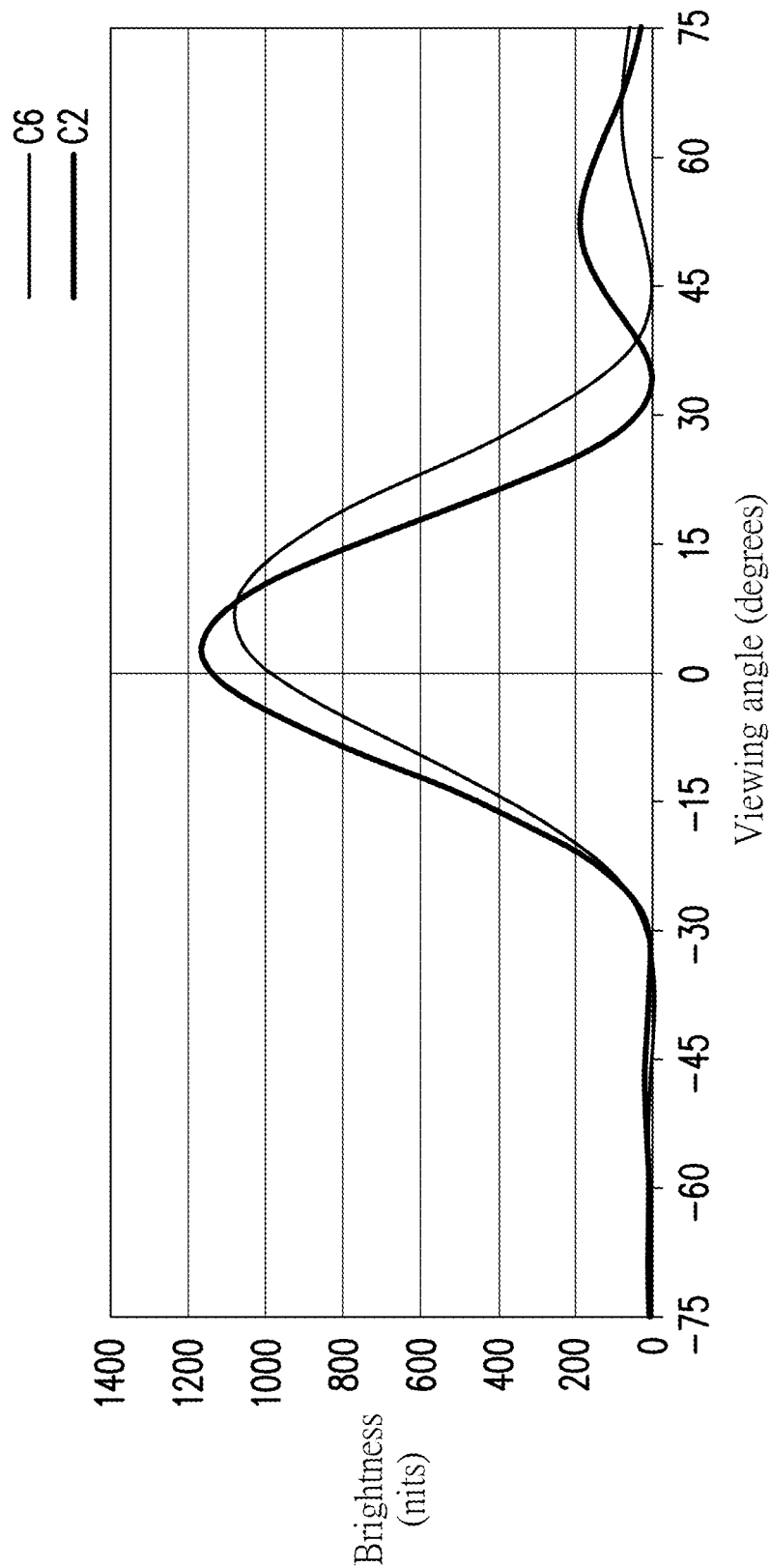
FIG. 15 is a luminance-viewing angle curve diagram of the display apparatus of FIG. 12 and the display apparatus of FIG. 1 operated in a narrow viewing angle mode.

FIG. 12 is a schematic cross-sectional view of a display apparatus according to the third embodiment of the invention. FIG. 13 is a schematic diagram illustrating the arrangement relationship between the alignment direction of the alignment layer, the axial directions of the absorption axes of the polarizers, and the axial direction of the slow axis of the half-wave plate of FIG. 12. FIG. 14A and FIG. 14B are transmittance distribution diagrams of the display apparatus of FIG. 12 respectively operated in different display modes. FIG. 15 is a luminance-viewing angle curve diagram of the display apparatus of FIG. 12 and the display apparatus of FIG. 1 operated in a narrow viewing angle mode.

Referring to FIG. 12 and FIG. 13, the difference between a display apparatus 10B of the embodiment and the display apparatus 10 of FIG. 1 is that the display apparatus 10B further includes a third polarizer POL3-A disposed between the half-wave plate 250 and the second electrically-controlled element 220, and the phase retardation amount of the second liquid-crystal layer LCL2 of the second electrically-controlled element 220 is smaller. It should be noted that in the embodiment, an included angle $\beta''$ between the axial direction of a third absorption axis AX3'' of the third polarizer POL3-A and the third alignment direction AD3 is 10 degrees. Since the configuration of the third alignment direction AD3 of the embodiment is the same as that of the third alignment direction AD3 of the third alignment layer AL3 of the embodiment of FIG. 1, the included angle between the third absorption axis AX3'' and the direction X of the embodiment is 95 degrees. Moreover, different from the half-wave plate 250 of FIG. 1, an included angle $\theta''$ between a slow axis SX'' of the half-wave plate 250A and the direction X of the present embodiment is 70 degrees.

Referring to FIG. 14A and FIG. 14B, since the third absorption axis AX3'' of the third polarizer POL3-A of the embodiment is neither parallel nor perpendicular to the third alignment direction AD3 of the third alignment layer AL3, when the display apparatus 10B is operated in the narrow viewing angle mode, the non-viewing area thereof is shifted relative to the non-viewing area of the display apparatus of each of the aforementioned embodiments. For example, when the display apparatus 10 of FIG. 1 is operated in the narrow viewing angle mode, the narrow viewing angle brightness distribution curve C2 along the direction X and including the front viewing angle (as shown in FIG. 15) shows that the display apparatus 10 still has a relatively high brightness in a viewing angle range of 55 degrees to 60 degrees, and the emitted light of the viewing angle range may have adverse effects in special usage situations. Therefore, in the present embodiment, when the display apparatus 10B is operated in the narrow viewing angle mode, the non-viewing area may be shifted (for example, shifted toward a large viewing angle) through the above configuration of the third polarizer POL3-A, so that the light output of the display apparatus 10B in the viewing angle range of 55 degrees to 60 degrees is suppressed (as shown by a curve C6 in FIG. 15), so as to meet different usage requirements.

Moreover, in the embodiment, by adjusting the phase retardation amount of the second liquid-crystal layer LCL2, the viewing angle range of the non-viewing area of the display apparatus 10B may also be adjusted. For example, the range of the non-viewing area of the display apparatus 10B is increased as the phase retardation amount of the second liquid-crystal layer LCL2 is decreased.

Figure 16:
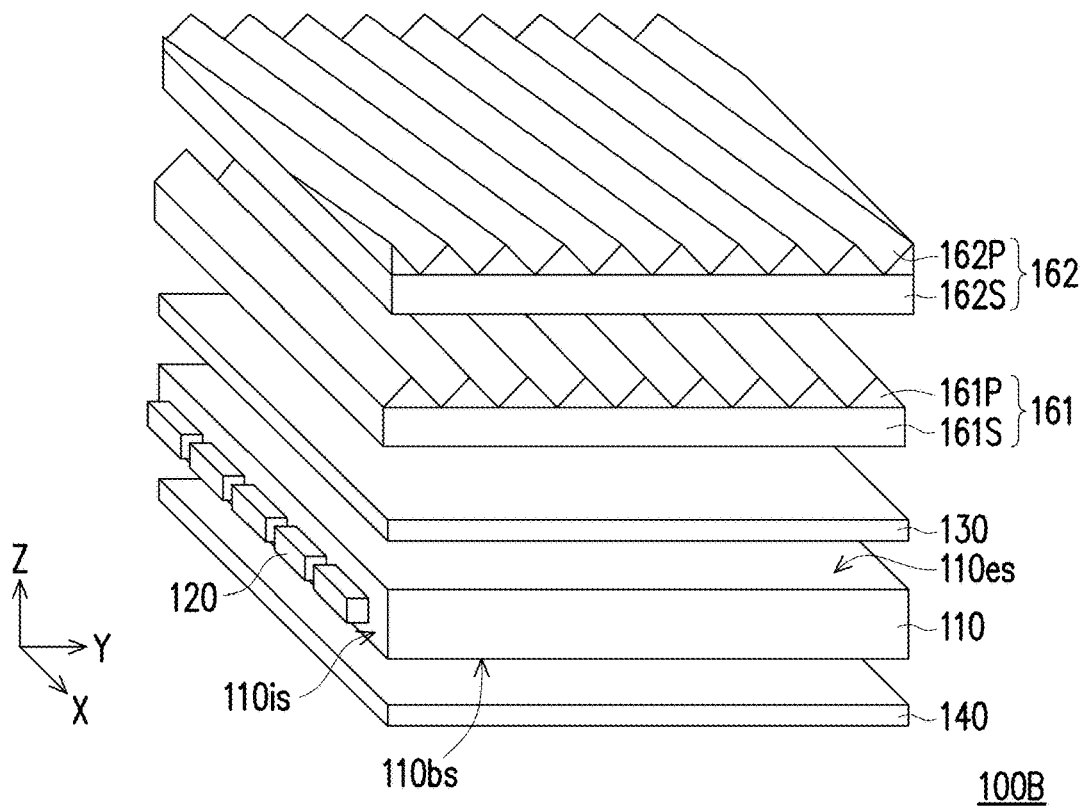
FIG. 16 is a schematic view of still another implementation of the backlight module of FIG. 1.
Figure 17:
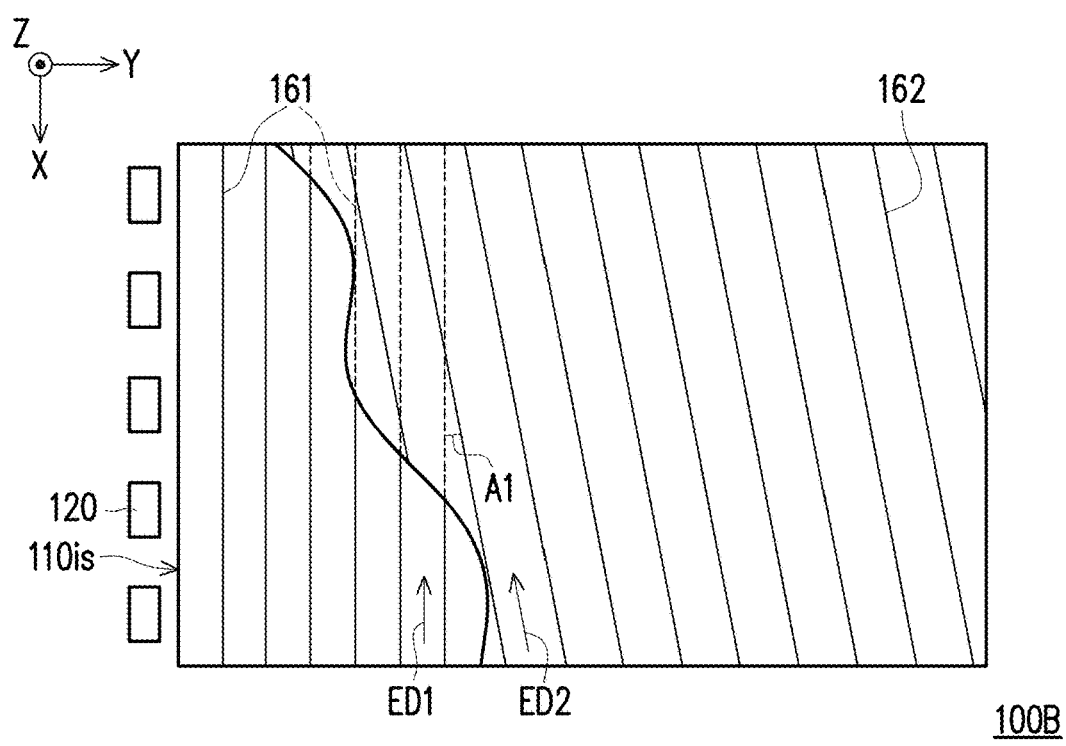
FIG. 17 is a schematic top view of a part of film layers of the backlight module of FIG. 16.
Figure 18:
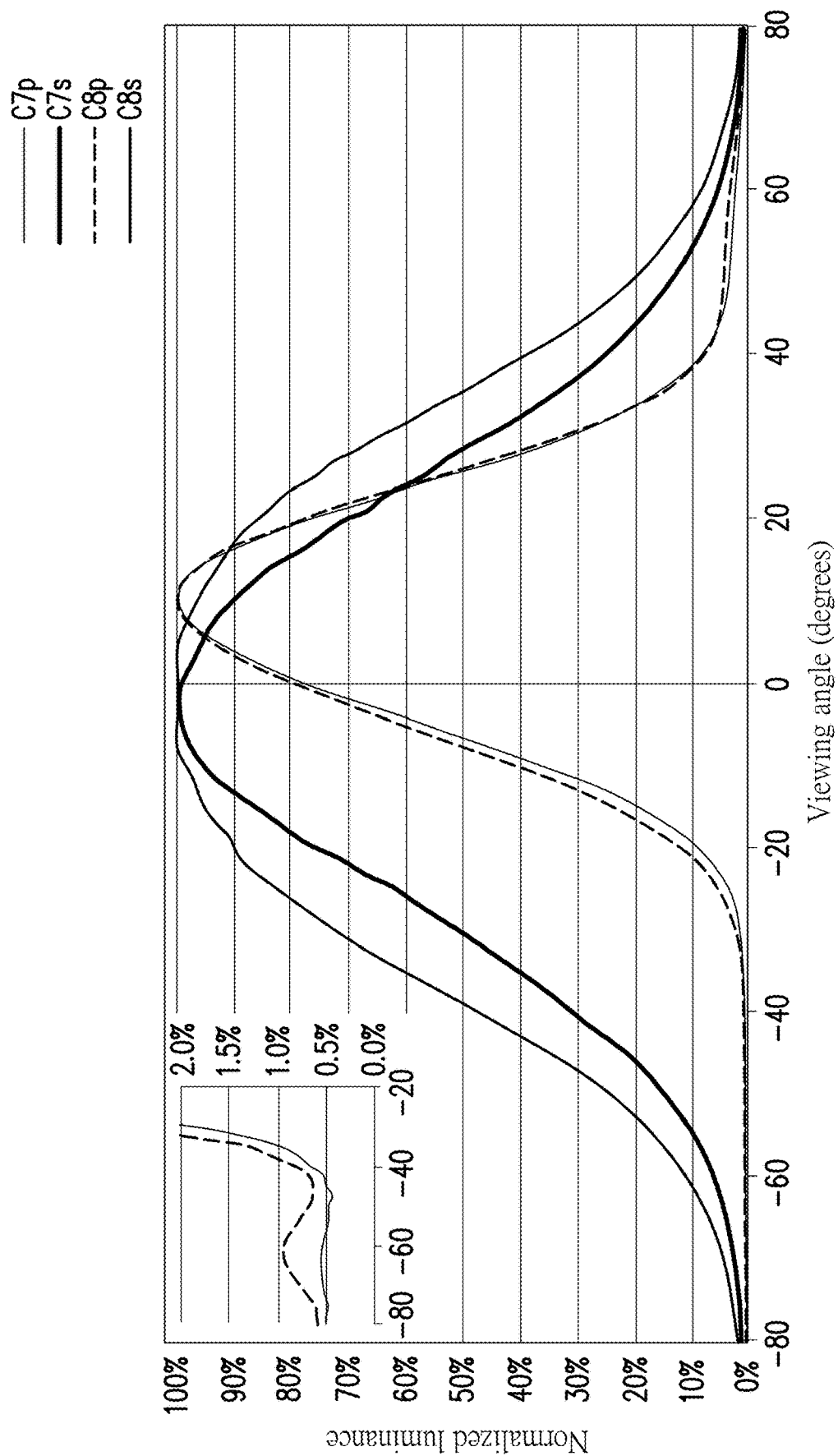
FIG. 18 is a normalized luminance-viewing angle curve diagram of the display apparatus when the backlight module of FIG. 1 is replaced with the backlight module of FIG. 16.
Figure 19:
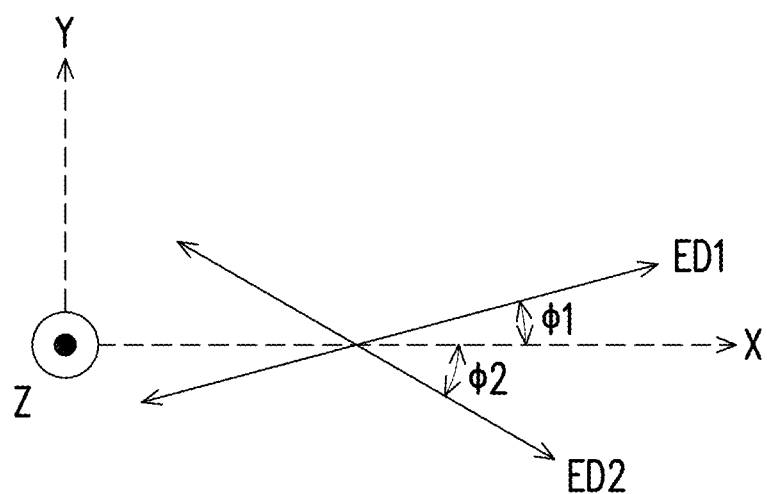
FIG. 19 is a schematic diagram illustrating the arrangement relationship between the extending directions of the first prism structures of the first optical brightness enhancement film and the second prism structures of the second optical brightness enhancement film.

FIG. 16 is a schematic view of still another implementation of the backlight module of FIG. 1. FIG. 17 is a schematic top view of a part of film layers of the backlight module of FIG. 16. FIG. 18 is a normalized luminance-viewing angle curve diagram of the display apparatus when the backlight module of FIG. 1 is replaced with the backlight module of FIG. 16. FIG. 19 is a schematic diagram illustrating the arrangement relationship between the extending directions of the first prism structures of the first optical brightness enhancement film and the second prism structures of the second optical brightness enhancement film. It is particularly noted that a curve diagram inset in FIG. 18 is a partial enlarged view of a curve C8p and a curve C7p.

Referring to FIG. 16 and FIG. 17, the difference between a backlight module 100B and the backlight module 100A of FIG. 8B lies in that the backlight module 100B of the embodiment is provided without the viewing angle control sheet 170. Besides, in the backlight module 100B, the optical brightness enhancement film 161 (i.e., the first optical brightness enhancement film) disposed on a side of the light-emitting surface 110es of the light guide plate 110 may include a substrate 161S and a plurality of prism structures 161P, and the optical brightness enhancement film 162 (i.e., the second optical brightness enhancement film) disposed on a side of the optical brightness enhancement film 161 away from the light guide plate 110 may includes a substrate 162S and a plurality of prism structures 162P.

In the embodiment, the prism structures 161P of the optical brightness enhancement film 161 are disposed on a side of the substrate 161S away from the light guide plate 110, and the prism structures 162P of the optical brightness enhancement film 162 are disposed on a side of the substrate 162s away from the light guide plate 110. In other words, the prism structures 161P of the optical brightness enhancement film 161 are arranged toward the optical brightness enhancement film 162, and the prism structures 162P of the optical brightness enhancement film 162 are arranged away from the optical brightness enhancement film 161.

It is particularly noted that, as illustrated in FIG. 19, an included angle $\phi1$ between an extending direction ED1 of the prism structures 161P of the optical brightness enhancement film 161 and the first viewing angle control direction (for example, the direction X) is less than 45 degrees, and an included angle $\phi2$ between an extending direction ED2 of the prism structures 162P of the optical brightness enhancement film 162 and the first viewing angle control direction is less than 45 degrees.

For example, as illustrated in FIG. 17 and FIG. 19, in the embodiment, the prism structures 161P of the optical brightness enhancement film 161 may be arranged in the direction Y and extend along the direction X, and the included angle φ2 between the extending direction ED2 of the prism structures 162P of the optical brightness enhancement film 162 and the direction X is, for example, 10 degrees. Namely, the extending direction ED1 of the prism structures 161P of the optical brightness enhancement film 161 is parallel to the light incident surface 110is (or the direction X) of the light guide plate 110, and an included angle A1 between the extending direction ED1 of the prism structures 161P of the optical brightness enhancement film 161 and the extending direction ED2 of the prism structures 162P of the optical brightness enhancement film 162 is 10 degrees, but the invention is not limited thereto.

In other embodiment (not shown), the extending direction of the prism structures of each of two optical brightness enhancement film may not be parallel to the light incident surface of the light guide plate, and the included angle (for example, the included angle A1) between the extending directions of the prism structures of the two optical brightness enhancement films may be greater than or equal to 5 degrees and less than or equal to 40 degrees, preferably, may be greater than or equal to 10 degrees and less than or equal to 20 degrees.

Referring to FIG. 16 and FIG. 18, the curve C8p and the curve C8s respectively illustrate the relationship between the normalized luminance and the viewing angle of the display apparatus operated in the narrow viewing angle mode and the wide viewing angle mode when a backlight module (not illustrated) of a comparative embodiment is provided with only one optical brightness enhancement film and the extending direction of the prism structures thereof are parallel to the light incident surface of the light guide plate. The curve C7p and the curve C7s respectively illustrate the relationship between the normalized luminance and the viewing angle of the display apparatus operated in the narrow viewing angle mode and the wide viewing angle mode when the backlight module 100 of FIG. 1 is replaced with the backlight module 100B of present embodiment.

Comparing the curve C7p and the curve C8p of curve diagram inset in FIG. 18, it can be known that the luminance of the backlight module with only one optical brightness enhancement film (i.e., the comparative embodiment) at a viewing angle of −60 degrees cannot be effectively supressed. Differently, the luminance of the display apparatus adopting the backlight module 100B of the embodiment at the viewing angle of −60 degrees can be suppressed, so as to improve the anti-peep effect of the display apparatus operated in the narrow viewing angle mode.

Figure 20:
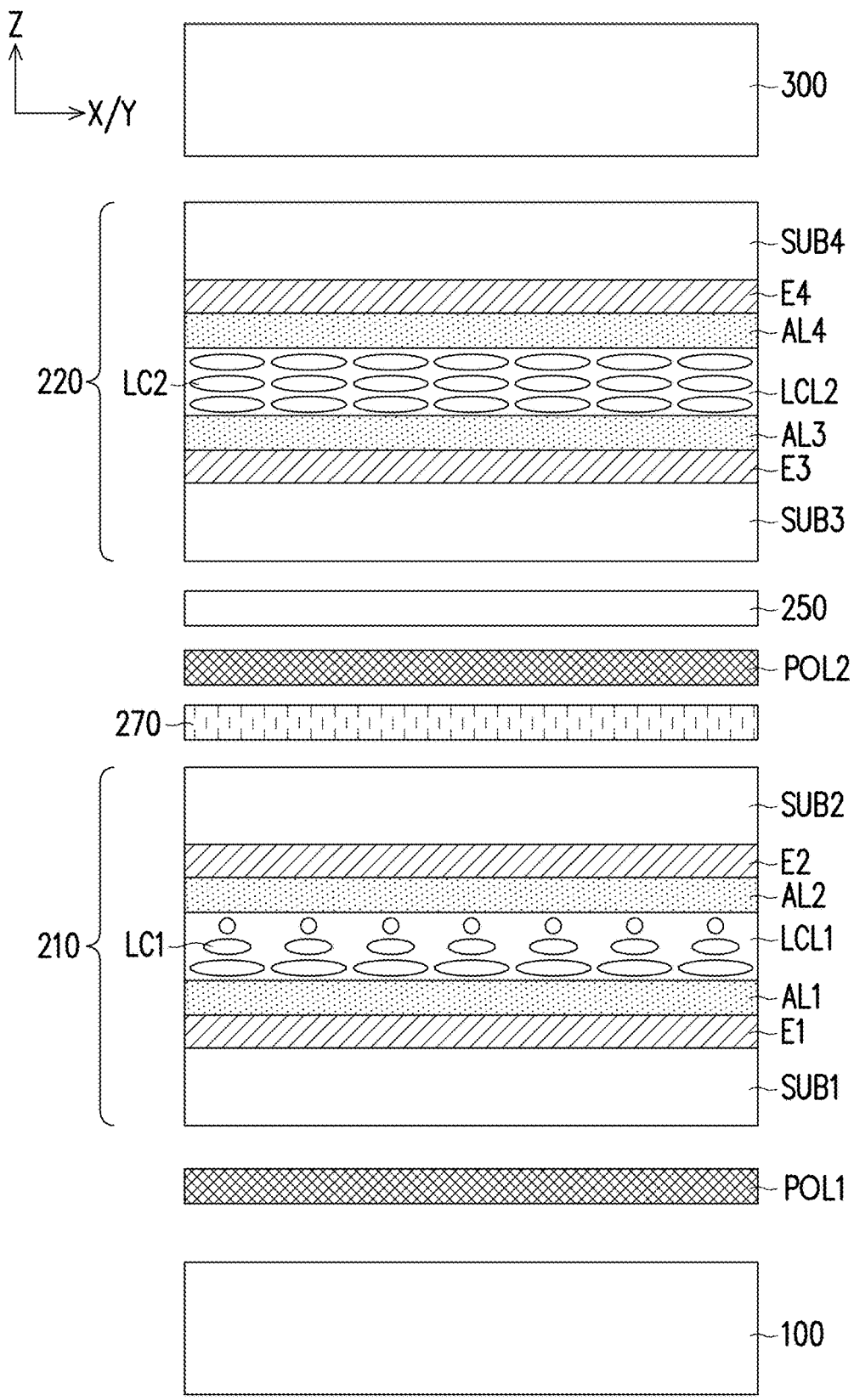
FIG. 20 is a schematic cross-sectional view of a display apparatus according to the fourth embodiment of the invention.
Figure 21A:
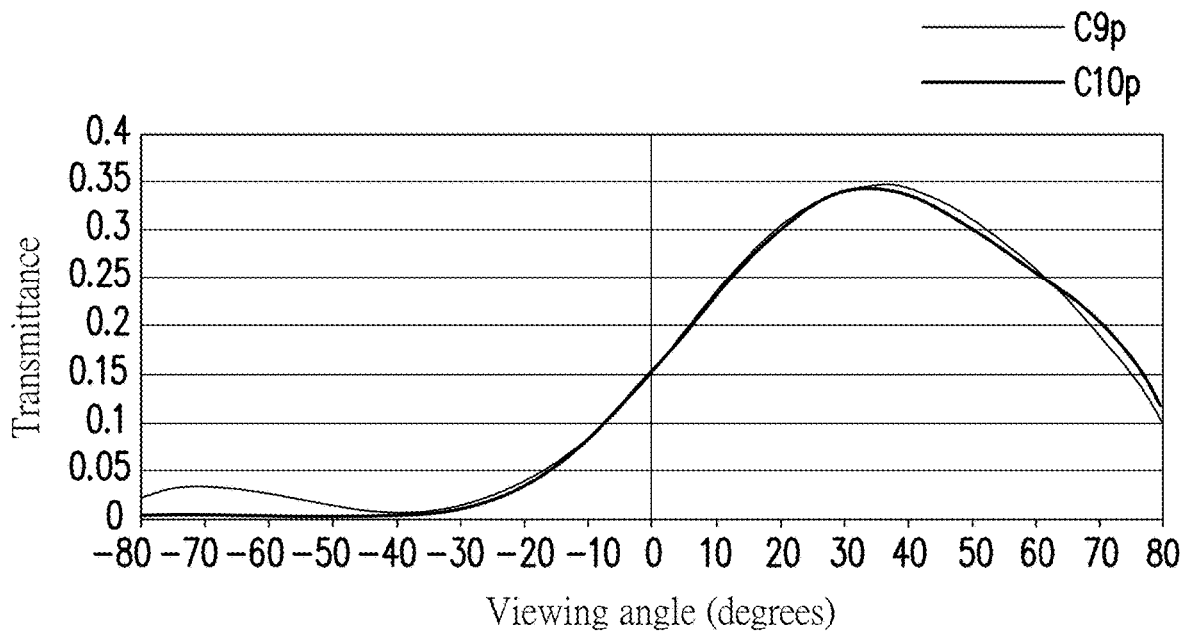
FIG. 21A and FIG. 21B are transmittance-viewing angle curve diagrams of the display apparatus of FIG. 20 operated in different display modes.
Figure 21B:
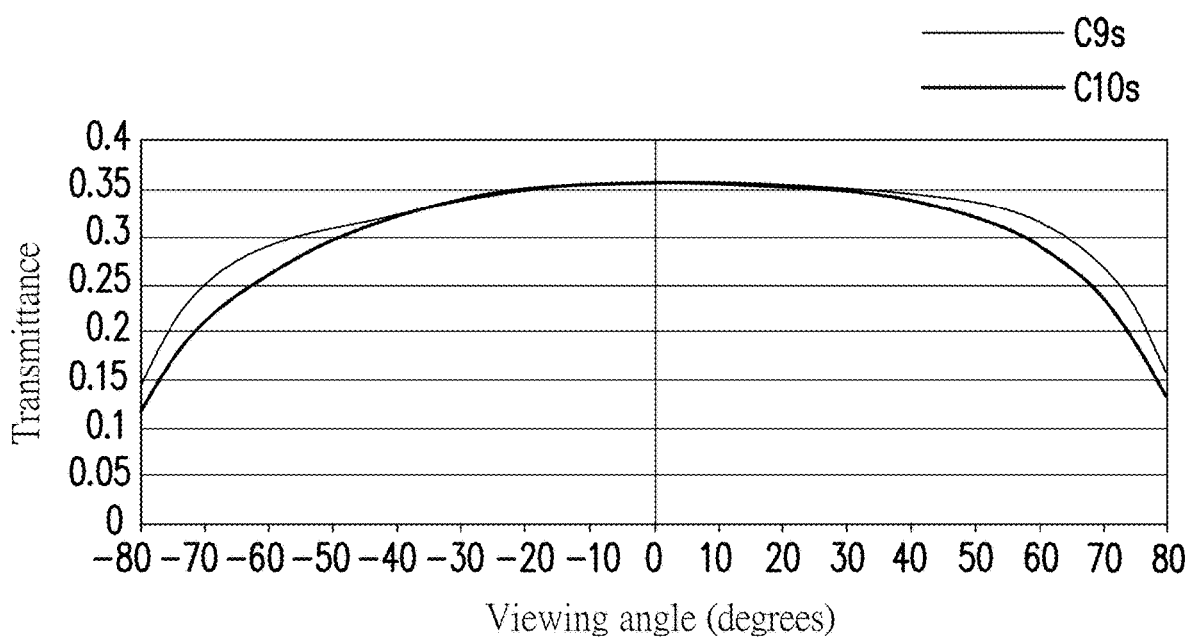
Figure 22A:
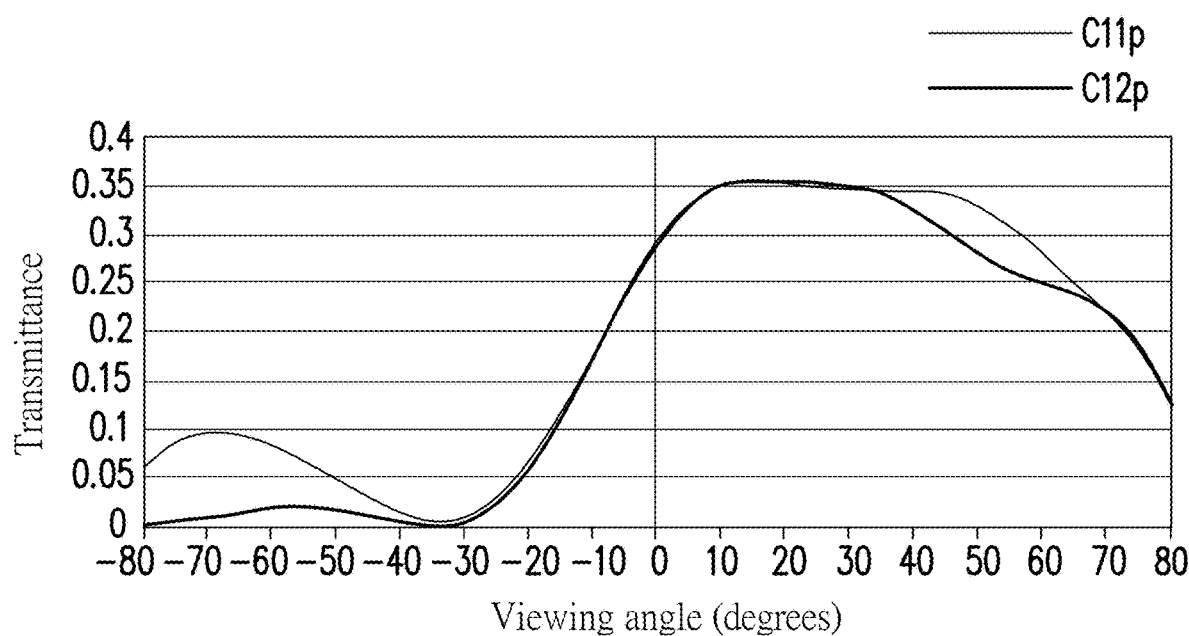
FIG. 22A and FIG. 22B are transmittance-viewing angle curve diagrams of the display apparatus operated in different display modes when the first electrically-controlled element of FIG. 20 is configured with another maximum phase retardation amount.
Figure 22B:
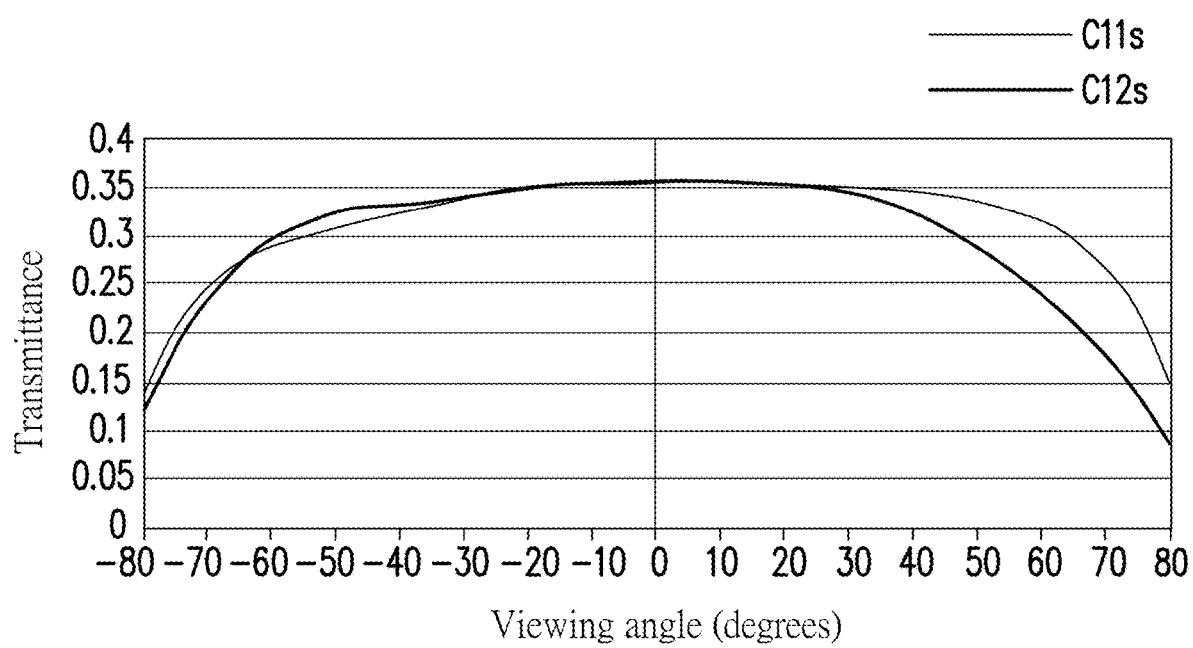

FIG. 20 is a schematic cross-sectional view of a display apparatus according to the fourth embodiment of the invention. FIG. 21A and FIG. 21B are transmittance-viewing angle curve diagrams of the display apparatus of FIG. 20 operated in different display modes. FIG. 22A and FIG. 22B are transmittance-viewing angle curve diagrams of the display apparatus operated in different display modes when the first electrically-controlled element of FIG. 20 is configured with another maximum phase retardation amount.

Referring to FIG. 20, the difference between the display apparatus 10C of the embodiment and the display apparatus 10 of FIG. 1 lies in that a compensation film 270 may be disposed between the first polarizer POL1 and the second polarizer POL2 of the display apparatus 10C, and the out-of-plane phase retardation amount of the compensation film 270 is greater than or equal to −400 nm and less than or equal to −50 nm (the out-of-plane phase retardation amount of the compensation film 270 is between −400 nm and −50 nm). The out-of-plane phase retardation amount herein, for example, is defined by [(nx+ny)/2−nz]×d, wherein nx, ny and nz are the refractive indices of the compensation film 270 along the direction X, the direction Y and the direction Z, respectively, and d is a film thickness of the compensation film 270 along the direction Z. The compensation film 270 is, for example, a C-plate compensation film.

When the maximum phase retardation amount (for example, a product of the refractive index difference and thickness) of the first electrically-controlled element 210 is 0.482 μm, the distribution of transmittance-viewing angle of the display apparatus 10C operated in the narrow viewing angle mode is illustrated as the curve C10p of FIG. 21A, wherein the out-of-plane phase retardation amount of the compensation film 270 of the display apparatus 10C is, for example, −120 nm. The curve C9p of FIG. 21A illustrates the distribution of transmittance-viewing angle of the display apparatus of the comparative embodiment operated in the narrow viewing angle mode when the out-of-plane phase retardation amount of the compensation film 270 is 0 nm (i.e., there is no compensation film 270).

It can be known from FIG. 21A that the configuration of the compensation film 270 may effectively suppress the light emission of the display apparatus in the range of viewing angle from −40 degrees to −80 degrees, so as to further improve the anti-peep effect of the display apparatus 10C operated in the narrow viewing angle mode, wherein the out-of-plane phase retardation amount of the compensation film 270 is greater than or equal to −120 nm and less than or equal to −80 nm. On the other hand, the luminance (as illustrated by the curve C10s of FIG. 21B) of the display apparatus 10C operated in the wide viewing angle mode at a large viewing angle is lower than the luminance (as illustrated by the curve C9s of FIG. 21B) of the display apparatus provided without the compensation film 270 and operated in the wide viewing angle mode at a large viewing angle.

Referring to FIG. 21A and FIG. 21B, the luminance of the display apparatus 10C near the normal viewing angle will drop significantly (for example, the transmittance will drop from 0.35 to 0.15) when the maximum phase retardation amount of the first electrically-controlled element 210 is 0.482 μm, and the display apparatus 10C is switched from the wide viewing angle mode to the narrow viewing angle mode.

To solve the problem, the maximum phase retardation amount of the first electrically-controlled element 210 may be greater than or equal to 1 μm and less than or equal to 1.2 μm. Correspondingly, the out-of-plane phase retardation amount of the compensation film 270 may be greater than or equal to −200 nm and less than or equal to −130 nm.

For example, when the maximum phase retardation amount of the first electrically-controlled element 210 is 1.08 μm, the distribution of transmittance-viewing angle of the display apparatus 10C operated in narrow viewing angle mode is illustrated as the curve C12p of FIG. 22A, wherein the out-of-plane phase retardation amount of the compensation film 270, for example, is −200 nm. The curve C11p of FIG. 22A illustrates the distribution of transmittance-viewing angle of the display apparatus of comparative embodiment operated in narrow viewing angle mode when the out-of-plane phase retardation amount of the compensation film 270 is 0 nm (i.e., there is no compensation film 270).

It can be known from FIG. 22A and FIG. 22B, the drop in luminance of the display apparatus 10C near the normal viewing angle is significantly reduced (for example, the transmittance drops from 0.35 to 0.3) when the display apparatus 10C is switched from the wide viewing angle mode to the narrow viewing angle mode due to the configuration of compensation film 270. On the other hand, the luminance (as illustrated by the curve C12s of FIG. 22B) of the display apparatus 10C operated in the wide viewing angle mode at a large viewing angle is lower than the luminance (as illustrated by the curve C11s of FIG. 22B) of the display apparatus provided without the compensation film 270 and operated in the wide viewing angle mode at a large viewing angle.

Based on the above, in the display apparatus of an embodiment of the invention, the electrically-controlled first liquid-crystal layer and second liquid-crystal layer are provided between the backlight module and the display panel. The included angle between the alignment direction on one side of the first liquid-crystal layer and the alignment direction on the other side thereof is between 75 degrees and 105 degrees, and the included angle between the alignment direction on one side of the second liquid-crystal layer and the alignment direction on the other side thereof is between 165 degrees and 195 degrees, wherein the included angle between the alignment direction of the first liquid-crystal layer close to the second liquid-crystal layer and the alignment direction of the second liquid-crystal layer close to the first liquid-crystal layer is between 30 degrees and 60 degrees, or between 120 degrees and 150 degrees, and two opposite sides of the first liquid-crystal layer are provided with two polarizers with absorption axes perpendicular to each other. Through the above configuration, the viewing angle range of the display apparatus in at least one direction may be electrically-controlled and switched to meet different usage situations.

On the other hand, the backlight module is provided with two optical brightness enhancement film, and an included angle between an extending direction of prism structures of each of the two optical brightness enhancement films and a viewing angle control direction of the display apparatus is less than 45 degrees. Accordingly, the anti-peep effect of the display apparatus operated in a narrow viewing angle mode may be improved. A compensation film with an out-of-plane phase retardation amount greater than or equal to −400 nm and less than or equal to −50 nm may also be provided between the first polarizer and the second polarizer to obtain a better anti-peep effect.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A display apparatus, comprising:
 a backlight module, comprising:
  a light guide plate having a light incident surface, and a light-emitting surface and a bottom surface connected to the light incident surface and opposite to each other;
  a first optical brightness enhancement film disposed on a side of the light-emitting surface of the light guide plate, and having a plurality of first prism structures, wherein an included angle between an extending direction of the first prism structures and a first viewing angle control direction of the display apparatus is less than 45 degrees; and
  a second optical brightness enhancement film disposed on a side of the first optical brightness enhancement film away from the light guide plate, and having a plurality of second prism structures, wherein an included angle between an extending direction of the second prism structures and the first viewing angle control direction of the display apparatus is less than 45 degrees;
 a first electrically-controlled element disposed on the backlight module and comprising:
  a first liquid-crystal layer; and
  a first alignment layer and a second alignment layer, wherein the first liquid-crystal layer is sandwiched between the first alignment layer and the second alignment layer, and an included angle between a first alignment direction of the first alignment layer and a second alignment direction of the second alignment layer is greater than or equal to 75 degrees and less than or equal to 105 degrees;
 a second electrically-controlled element disposed on the first electrically-controlled element and comprising:
  a second liquid-crystal layer; and
  a third alignment layer and a fourth alignment layer, wherein the second liquid-crystal layer is sandwiched between the third alignment layer and the fourth alignment layer, and an included angle between a third alignment direction of the third alignment layer and a fourth alignment direction of the fourth alignment layer is greater than or equal to 165 degrees and less than or equal to 195 degrees, wherein an included angle between the second alignment direction and the third alignment direction is greater than or equal to 30 degrees and less than or equal to 60 degrees, or greater than or equal to 120 degrees and less than or equal to 150 degrees;

a first polarizer disposed between the backlight module and the first electrically-controlled element and having a first absorption axis parallel or perpendicular to the first alignment direction;

a second polarizer disposed between the first electrically-controlled element and the second electrically-controlled element and having a second absorption axis, wherein an axial direction of the second absorption axis is perpendicular to an axial direction of the first absorption axis;

a half-wave plate disposed between the second polarizer and the second electrically-controlled element; and a display panel disposed on the second electrically-controlled element.

2. The display apparatus as claimed in claim 1, wherein an included angle between the extending direction of the first prism structures and the extending direction of the second prism structures is greater than or equal to 5 degrees and less than or equal to 40 degrees.

3. The display apparatus as claimed in claim 1, wherein the first prism structures of the first optical brightness enhancement film and the second prism structures of the second optical brightness enhancement film are disposed away from the light guide plate.

4. The display apparatus as claimed in claim 1, wherein an axial direction of a slow axis of the half-wave plate is located between the axial direction of the second absorption axis of the second polarizer and the third alignment direction.

5. The display apparatus as claimed in claim 1, wherein an included angle between the third alignment direction and the first viewing angle control direction of the display apparatus is 85 degrees.

6. The display apparatus as claimed in claim 1, wherein an included angle between the first alignment direction or the second alignment direction and the first viewing angle control direction of the display apparatus is 45 degrees.

7. The display apparatus as claimed in claim 1, wherein the first absorption axis is parallel to the first alignment direction, and the second absorption axis is parallel to the second alignment direction.

8. The display apparatus as claimed in claim 1, wherein an included angle between an axial direction of a slow axis of the half-wave plate and the first viewing angle control direction of the display apparatus is greater than or equal to 50 degrees and less than or equal to 80 degrees or greater than or equal to 140 degrees and less than or equal to 170 degrees.

9. The display apparatus as claimed in claim 1, further comprising:

a third polarizer disposed between the half-wave plate and the second electrically-controlled element, wherein an included angle between an axial direction of a third absorption axis of the third polarizer and the third alignment direction is greater than or equal to −15 degrees and less than or equal to 15 degrees or greater than or equal to 75 degrees and less than or equal to 105 degrees.

10. The display apparatus as claimed in claim 9, further comprising:

a first compensation film disposed between the third polarizer and the second electrically-controlled element; and a second compensation film disposed between the second electrically-controlled element and the display panel, wherein a sum of out-of-plane phase retardation amounts of the first compensation film and the second compensation film is greater than or equal to 200 nm and less than or equal to 1000 nm.

11. The display apparatus as claimed in claim 9, wherein the third absorption axis of the third polarizer is neither parallel nor perpendicular to the third alignment direction of the third alignment layer.

12. A display apparatus, comprising:

a backlight module;

a first electrically-controlled element disposed on the backlight module and comprising:

a first liquid-crystal layer; and a first alignment layer and a second alignment layer, wherein the first liquid-crystal layer is sandwiched between the first alignment layer and the second alignment layer, and an included angle between a first alignment direction of the first alignment layer and a second alignment direction of the second alignment layer is greater than or equal to 75 degrees and less than or equal to 105 degrees;

a second electrically-controlled element disposed on the first electrically-controlled element and comprising:

a second liquid-crystal layer; and a third alignment layer and a fourth alignment layer, wherein the second liquid-crystal layer is sandwiched between the third alignment layer and the fourth alignment layer, and an included angle between a third alignment direction of the third alignment layer and a fourth alignment direction of the fourth alignment layer is greater than or equal to 165 degrees and less than or equal to 195 degrees, wherein an included angle between the second alignment direction and the third alignment direction is greater than or equal to 30 degrees and less than or equal to 60 degrees, or greater than or equal to 120 degrees and less than or equal to 150 degrees;

a first polarizer disposed between the backlight module and the first electrically-controlled element and having a first absorption axis parallel or perpendicular to the first alignment direction;

a second polarizer disposed between the first electrically-controlled element and the second electrically-controlled element and having a second absorption axis, wherein an axial direction of the second absorption axis is perpendicular to an axial direction of the first absorption axis;

a half-wave plate disposed between the second polarizer and the second electrically-controlled element; and a display panel disposed on the second electrically-controlled element; and a compensation film disposed between the first polarizer and the second polarizer, wherein an out-of-plane phase retardation amount of the compensation film is greater than or equal to −400 nm and less than or equal to −50 nm.

13. The display apparatus as claimed in claim 12, wherein the compensation film is a C-plate compensation film.

14. A method of driving a display apparatus, comprising:
providing the display apparatus, wherein the display apparatus comprises:

a backlight module, comprising:

a light guide plate having a light incident surface, and a light-emitting surface and a bottom surface connected to the light incident surface and opposite to each other;

a first optical brightness enhancement film disposed on a side of the light-emitting surface of the light guide plate, and having a plurality of first prism structures, wherein an included angle between an extending direction of the first prism structures and a first viewing angle control direction of the display apparatus is less than 45 degrees; and a second optical brightness enhancement film disposed on a side of the first optical brightness enhancement film away from the light guide plate, and having a plurality of second prism structures, wherein an included angle between an extending direction of the second prism structures and the first viewing angle control direction of the display apparatus is less than 45 degrees;

a first electrically-controlled element disposed on the backlight module and comprising:
- a first liquid-crystal layer; and
- a first alignment layer and a second alignment layer, wherein the first liquid-crystal layer is sandwiched between the first alignment layer and the second alignment layer, and an included angle between a first alignment direction of the first alignment layer and a second alignment direction of the second alignment layer is greater than or equal to 75 degrees and less than or equal to 105 degrees;

a second electrically-controlled element disposed on the first electrically-controlled element and comprising:
- a second liquid-crystal layer; and
- a third alignment layer and a fourth alignment layer, wherein the second liquid-crystal layer is sandwiched between the third alignment layer and the fourth alignment layer, and an included angle between a third alignment direction of the third alignment layer and a fourth alignment direction of the fourth alignment layer is greater than or equal to 165 degrees and less than or equal to 195 degrees, wherein an included angle between the second alignment direction and the third alignment direction is greater than or equal to 30 degrees and less than or equal to 60 degrees, or greater than or equal to 120 degrees and less than or equal to 150 degrees;

a first polarizer disposed between the backlight module and the first electrically-controlled element and having a first absorption axis parallel or perpendicular to the first alignment direction;

a second polarizer disposed between the first electrically-controlled element and the second electrically-controlled element and having a second absorption axis, wherein an axial direction of the second absorption axis is perpendicular to an axial direction of the first absorption axis;

a half-wave plate disposed between the second polarizer and the second electrically-controlled element; and a display panel disposed on the second electrically-controlled element;

providing a first voltage to the first electrically-controlled element and the second electrically-controlled element to operate the display apparatus in a wide viewing angle mode; and providing a second voltage and a third voltage to the first electrically-controlled element and the second electrically-controlled element, respectively, to operate the display apparatus in a narrow viewing angle mode, wherein the first voltage is smaller than the second voltage and the third voltage.

15. The method of driving the display apparatus as claimed in claim 14, further comprising:
tuning the second voltage provided to the first electrically-controlled element when the display apparatus is operated in the narrow viewing angle mode and has a narrow viewing angle brightness distribution curve, wherein a viewing angle corresponding to a peak of the narrow viewing angle brightness distribution curve is moved along a first viewing angle control direction of the display apparatus with a variation of the second voltage.

16. The method of driving the display apparatus as claimed in claim 14, further comprising:
tuning the third voltage provided to the second electrically-controlled element when the display apparatus is operated in the narrow viewing angle mode and has a narrow viewing angle brightness distribution curve, wherein a viewing angle corresponding to a valley of the narrow viewing angle brightness distribution curve is moved along a second viewing angle control direction of the display apparatus with a variation of the third voltage.

* * * * *